United States Patent [19]
Welch et al.

[11] Patent Number: 5,838,472
[45] Date of Patent: Nov. 17, 1998

[54] METHOD AND APPARATUS FOR LOCATING A TRANSMITTER OF A DIFFUSE INFRARED SIGNAL WITHIN AN ENCLOSED AREA

[75] Inventors: Jeffrey Peter Welch, Libertyville; Ellen L. Oschmann, Winnetka, both of Ill.

[73] Assignee: Spectrix Corporation, Deerfield, Ill.

[21] Appl. No.: 675,501

[22] Filed: Jul. 3, 1996

[51] Int. Cl.[6] .................................................. H04B 10/00
[52] U.S. Cl. ...................... 359/155; 359/172; 340/825.07
[58] Field of Search ........................... 359/155, 152, 359/154, 161, 172; 340/825.07

[56] References Cited

U.S. PATENT DOCUMENTS

| | | | |
|---|---|---|---|
| 3,971,943 | 7/1976 | Jeunehomme et al. | 250/372 |
| 4,275,385 | 6/1981 | White | 340/825.07 |
| 4,402,090 | 8/1983 | Gfeller et al. | 455/601 |
| 4,540,605 | 9/1985 | Barone | 427/243 |
| 4,596,050 | 6/1986 | Rogers | 455/607 |
| 4,627,106 | 12/1986 | Drake | 455/617 |
| 4,723,314 | 2/1988 | Schneeberger | 455/619 |
| 4,727,600 | 2/1988 | Avakian | 359/172 |
| 4,864,651 | 9/1989 | Ogiwara et al. | 455/617 |
| 4,977,618 | 12/1990 | Allen | 455/607 |
| 5,062,151 | 10/1991 | Shipley | 359/154 |
| 5,091,648 | 2/1992 | Owers | 250/342 |
| 5,099,346 | 3/1992 | Lee et al. | 359/118 |
| 5,107,120 | 4/1992 | Tom | 250/342 |
| 5,142,396 | 8/1992 | Divjak et al. | 359/142 |
| 5,218,356 | 6/1993 | Knapp | 342/350 |
| 5,297,144 | 3/1994 | Gilbert et al. | 370/95.2 |
| 5,311,353 | 5/1994 | Crawford | 359/333 |
| 5,319,201 | 6/1994 | Lee | 250/349 |
| 5,321,542 | 6/1994 | Feitas et al. | 359/172 |
| 5,340,993 | 8/1994 | Salina et al. | 250/551 |
| 5,410,282 | 4/1995 | Larrick et al. | 330/149 |
| 5,416,627 | 5/1995 | Wilmoth | 359/159 |
| 5,424,859 | 6/1995 | Uehara et al. | 359/152 |
| 5,526,161 | 6/1996 | Suzuki et al. | 359/172 |
| 5,528,391 | 6/1996 | Elrod | 359/36 |
| 5,566,022 | 10/1996 | Segev | 359/172 |
| 5,588,009 | 12/1996 | Will | 371/33 |
| 5,627,524 | 5/1997 | Fredrickson et al. | 340/825.07 |
| 5,633,742 | 5/1997 | Shipley | 359/132 |

*Primary Examiner*—Rafael Bacares
*Attorney, Agent, or Firm*—Welsh & Katz, Ltd.

[57] ABSTRACT

A method and apparatus is provided of locating a portable remote station transceiving a diffuse infrared communicated signal within an enclosed area containing a plurality of stationary infrared transceivers interconnected with a central controller. The method includes the steps of detecting a particular transmission of the diffuse infrared communicated signal from the portable remote station within the enclosed area by the plurality of stationary transceivers and measuring a parametric value of the particular signal received by each stationary transceiver of the plurality of stationary transceivers. The method further includes the step of locating the portable remote station based upon differences in the parametric value measured at each stationary transceivers.

24 Claims, 16 Drawing Sheets

*FIG. 1*
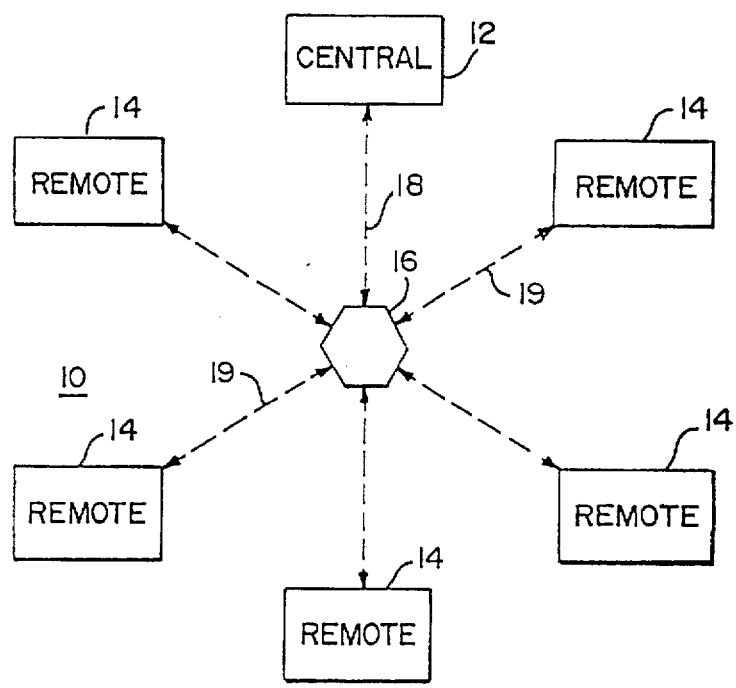
*FIG. 2*
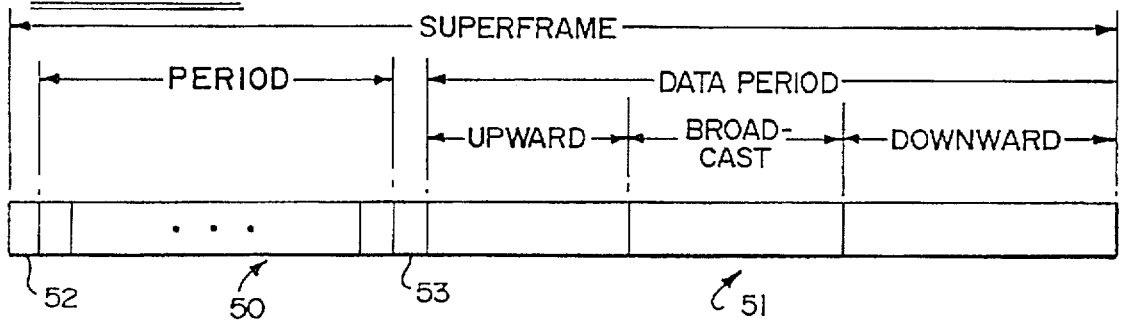
*FIG. 3*
*FIG. 5*
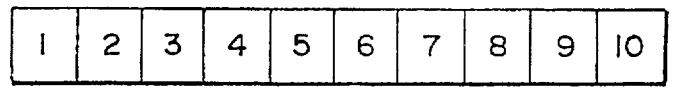

FIG. 4a
RSYNC-Request Sync
MRSYNC-Mandatory Request Sync
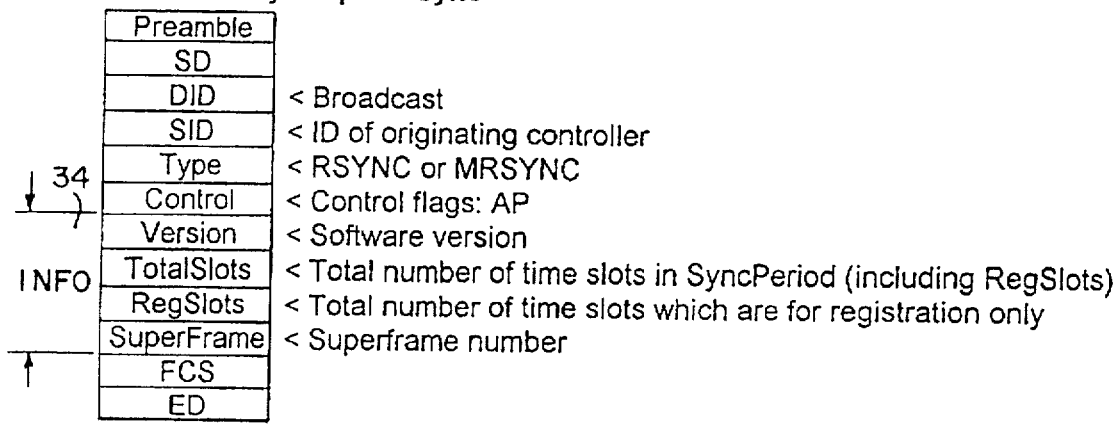
DSYNC-Data Sync
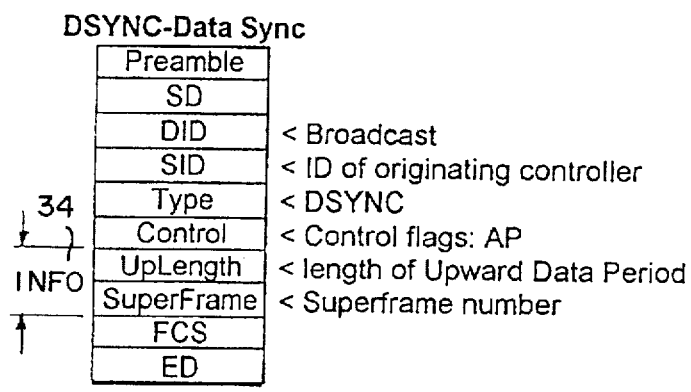
EDSYNC-Extended Data Sync
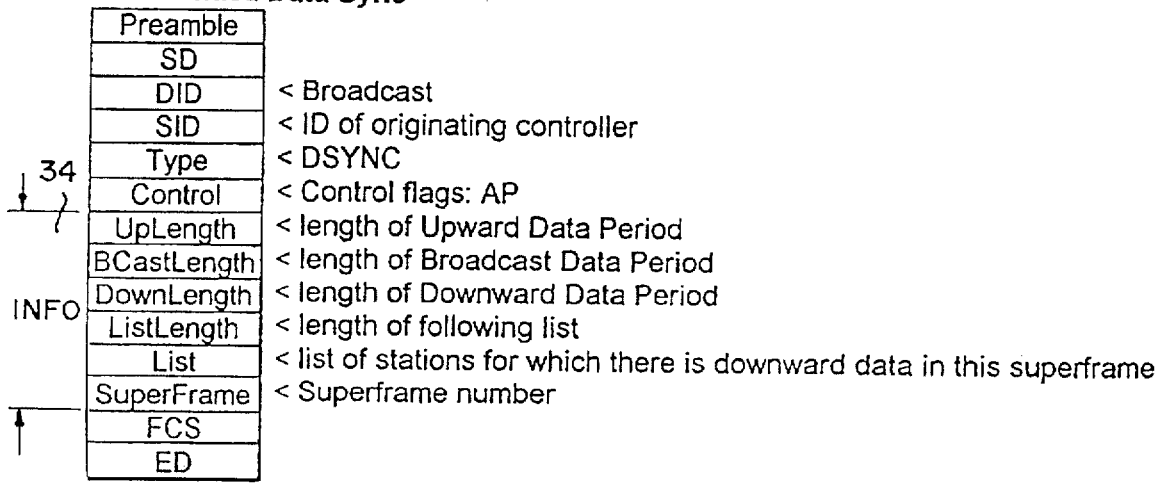

FIG. 4b

RegRTS-Registration Request

| Preamble | |
|---|---|
| SD | |
| DID | < Destination Station ID |
| SID | < registration slot number ( temporary station ID) |
| Type | < regRTS |
| Control | < Control flags: none used |
| Version | < Software version |
| SA | < Address station registering, 48-bit address |
| FCS | |
| ED | |

(34 / INFO)

RTS-Request To Send

| Preamble | |
|---|---|
| SD | |
| DID | < Destination Station ID |
| SID | < Source Station ID |
| Type | < RTS |
| Control | < Control flags: AP, sequence, out-of-sequence, retry, more |
| DataCount | < Number of data frames station wants to send to DA |
| DataLength | < Length, in octets, of data the source wants to send |
| DA | < Address station to which data is to be sent, 48-bit address |
| FCS | |
| ED | |

(34 / INFO)

FORF-Forfeit

| Preamble | |
|---|---|
| SD | |
| DID | < Destination Station ID |
| SID | < Source Station ID |
| Type | < FORF |
| Control | < Control flags: none used |
| FCS | |
| ED | |

RegCTS-Registration Clear to Send

| Preamble | |
|---|---|
| SD | |
| DID | < Destination Staion ID |
| SID | < ID of originating controller |
| Type | < RegCTS |
| Control | < Control flags: AP |
| ID | < ID assigned to station |
| SA | < Address station registering, 48-bit address |
| FCS | |
| ED | |

(34 / INFO)

FIG. 4c

CTS-Clear To Send

| Preamble | |
|---|---|
| SD | |
| DID | < Destination Station ID |
| SID | < Source Station ID |
| Type | < CTS |
| Control | < Control flags: AP, sequence, out-of-sequence |
| FCS | |
| ED | |

DATA- Data

| Preamble | |
|---|---|
| SD | |
| DID | < Destination Station ID |
| SID | < Source Station ID |
| Type | < DATA |
| Control | < Control flags: AP, sequence, out-of-sequence, retry, more |
| SA | < Address of data originator, 48-bit address |
| DataLength | < Length, in octets, of data to be sent |
| Data | < Data |
| FCS | |
| ED | |

(34, INFO)

MDATA-Management Data

| Preamble | |
|---|---|
| SD | |
| DID | < Destination Station ID |
| SID | < Source Station ID |
| Type | < MDATA |
| Control | < Control flags: AP, sequence, out-of-sequence, retry, hierarchical |
| SA | < Address of data originator, 48-bit address |
| MType | < Type of management message |
| Data | < according to MType |
| FCS | |
| ED | |

(34, INFO)

Acknowledge

| Preamble | |
|---|---|
| SD | |
| DID | < Destination Station ID |
| SID | < Source Station ID |
| Type | < ACK |
| Control | < Control flags: AP |
| FCS | |
| ED | |

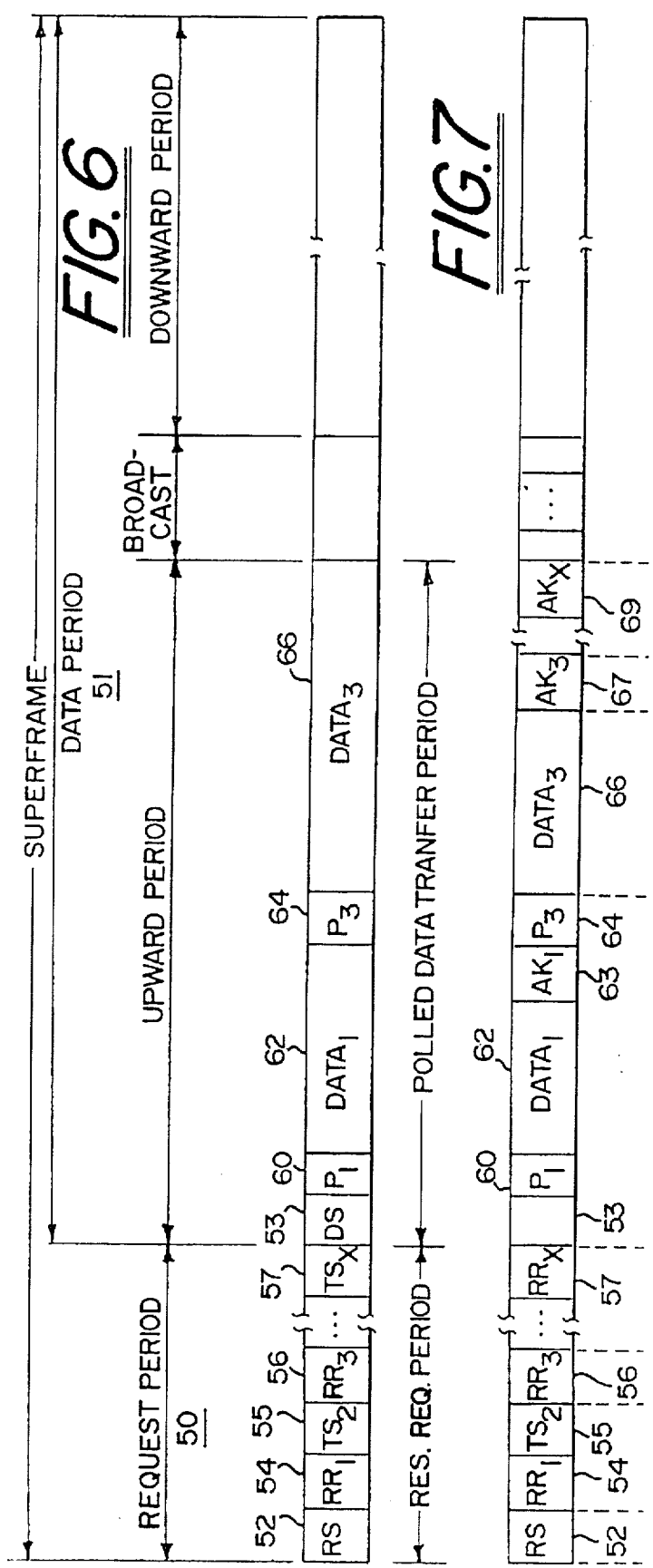

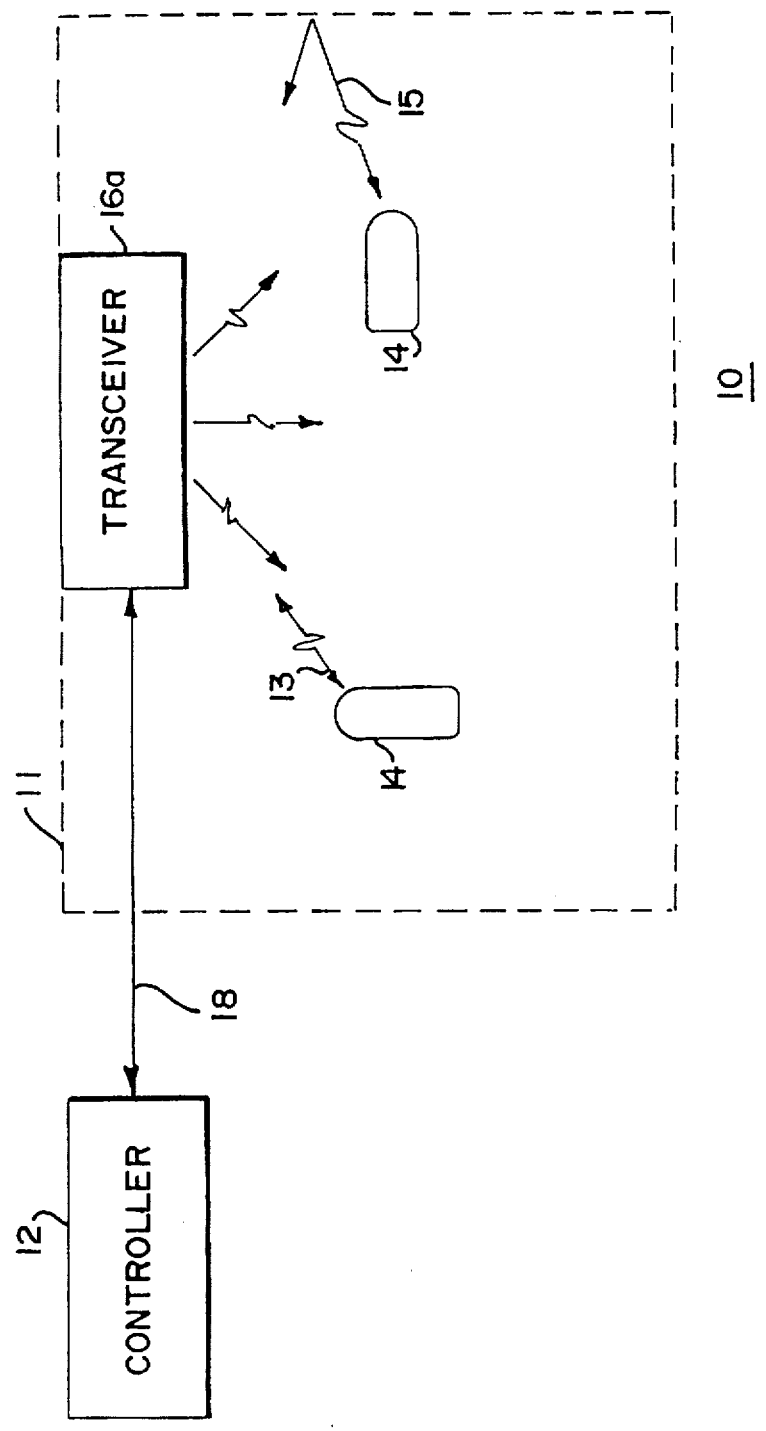

*FIG. 14*
*FIG. 14a*
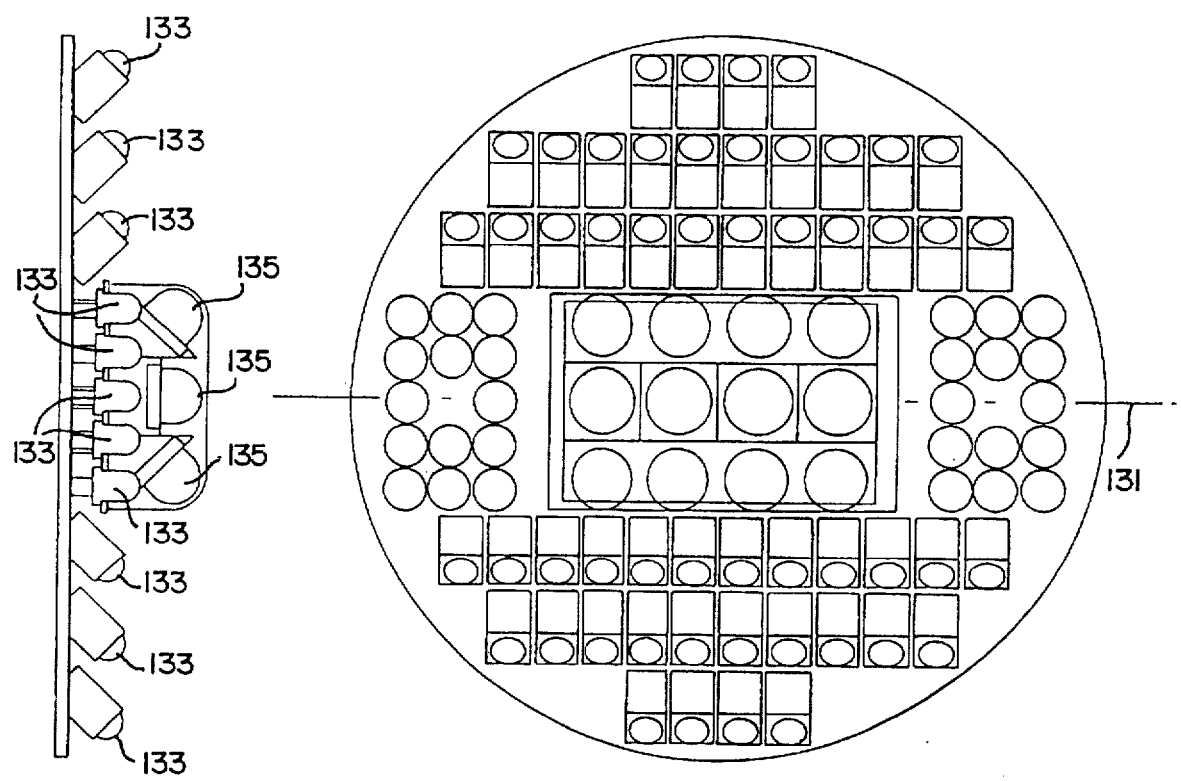
*FIG. 14b*
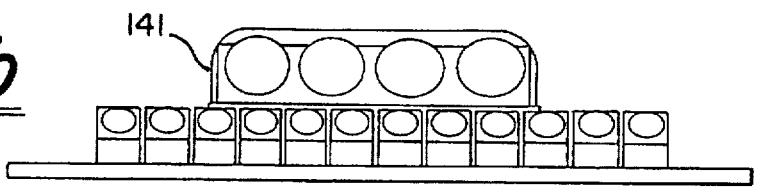

METHOD AND APPARATUS FOR LOCATING A TRANSMITTER OF A DIFFUSE INFRARED SIGNAL WITHIN AN ENCLOSED AREA

BACKGROUND OF THE INVENTION

This invention generally relates to the field of data communication networks. More particularly, this invention pertains to wireless local area networks (LANs) for a data communication network having a number of users exchanging data between individual remote stations and a central station over a single optical infrared channel.

A multipoint digital communication network typically consists of a number of remote stations which communicate with a central station over one or more two-way communication channels. For example, personal computers are typically connected to a wide variety of peripherals or other computers via wire cables, i.e., a hard-wired communication link. Moreover, local area networks (LANs) are often used to integrate remote terminals that are located at the same site. Depending upon the number of users, distance between terminals, number of peripherals, frequency of system reconfiguration, portability of the remote stations, etc., the hard-wired cable system may not be practical for a given application. Hence, various wireless communication technologies have been employed, particularly when a system includes a large number of users and/or portable, hand-held computer devices.

Among the more common wireless technologies are narrow-band radio frequency (RF) systems, spread spectrum RF, ultrasonic, and infrared optical. Radio frequency systems are often significantly degraded by electromagnetic noise and interference, as well as by large signal amplitude variations and multipath interference. Moreover, RF systems are typically subject to governmental licensing and regulation. Alternative wireless systems employing ultrasonic sound waves experience severe problems with the complete loss of signals due to nulls in the transmission path.

Optical-infrared communication, however, is not affected by electromagnetic interference, and is much less susceptible to multipath interference. Furthermore, optical systems are inherently secure (since the infrared light does not penetrate walls), have no known health or safety effects (at low power levels), and are not subject to F.C.C. regulation. Moreover, infrared transceivers draw relatively low currents, which is particularly important with respect to hand-held battery-powered portable computers. Thus, the use of infrared light as the wireless medium is well suited to such applications.

One practical infrared LAN was taught by Lee in U.S. Pat. No 5,099,346, (Lee) assigned to the assignee of the present invention. Under Lee a number of computers and peripherals (remote stations) were interconnected using an infrared optical communication system. While Lee worked well, the infrared devices of Lee were line-of-sight devices. Line-of-sight devices are not particularly well suited to palmtop computers or other data processing devices requiring great mobility. Because of the importance of mobile communication between data processing devices in enclosed areas and in the utility of palmtop computers in general, a need exists for a means of exchanging data between mobile and stationary data processing devices that is more flexible than line-of-sight devices and yet not susceptible to electromagnetic interference.

Accordingly, a primary object of the present invention is to provide a method for using existing infrared transmitting and receiving apparatus, but in an arrangement to enable the transceiving of infrared signals indirectly as well as line-of-sight.

A further and more particular object of this present invention is to provide a radiation filter for a photodiode detector of the transceivers which blocks radiation outside the infrared region thereby increasing sensitivity of the infrared receivers.

A further and more particular object of this present invention is to provide an infrared detector within an infrared receiver whose speed and performance is not dependent upon changes in signalling light levels.

A further and more particular object of this present invention is to provide a means of locating a portable remote station based upon measured parameters of the portable remote station.

SUMMARY OF THE INVENTION

A method and apparatus is provided of locating a portable remote station transceiving a diffuse infrared communicated signal within an enclosed area containing a plurality of stationary infrared transceivers interconnected with a central controller. The method includes the steps of detecting a particular transmission of the diffuse infrared communicated signal from the portable remote station within the enclosed area by the plurality of stationary transceivers and measuring a parametric value of the particular signal received by each stationary transceiver of the plurality of stationary transceivers. The method further includes the step of locating the portable remote station based upon differences in the parametric value measured at each stationary transceivers.

BRIEF DESCRIPTION OF THE APPENDIX AND DRAWINGS

The features of the present invention which are believed to be novel are set forth with particularity in the appended claims. The invention itself, however, together with further objects and advantages thereof, may best be understood with reference to the following description when taken in conjunction with the accompanying appendix and drawings, in which:

Appendix I is a description of operation (including flowcharts) of a Field Programmable Gate Array;

FIG. 1 is a general block diagram of the wireless data communication network according to the present invention;

FIG. 2 is a pictorial representation of the channel frame format utilized in the multiple-access signalling protocol of the present invention;

FIG. 3 is a timing cycle diagram illustrating the two-stage reservation-based polling protocol and data exchange system of the present invention;

FIGS. 4A–C provide a summary of network control function by frame type in accordance with the invention along with a description of frame content within individual fields of the frame;

FIG. 5 depicts a slot arrangement used within the request period in accordance with the invention;

FIG. 6 is a timing cycle diagram similar to that of FIG. 3 illustrating slot usage.

Figure 9:
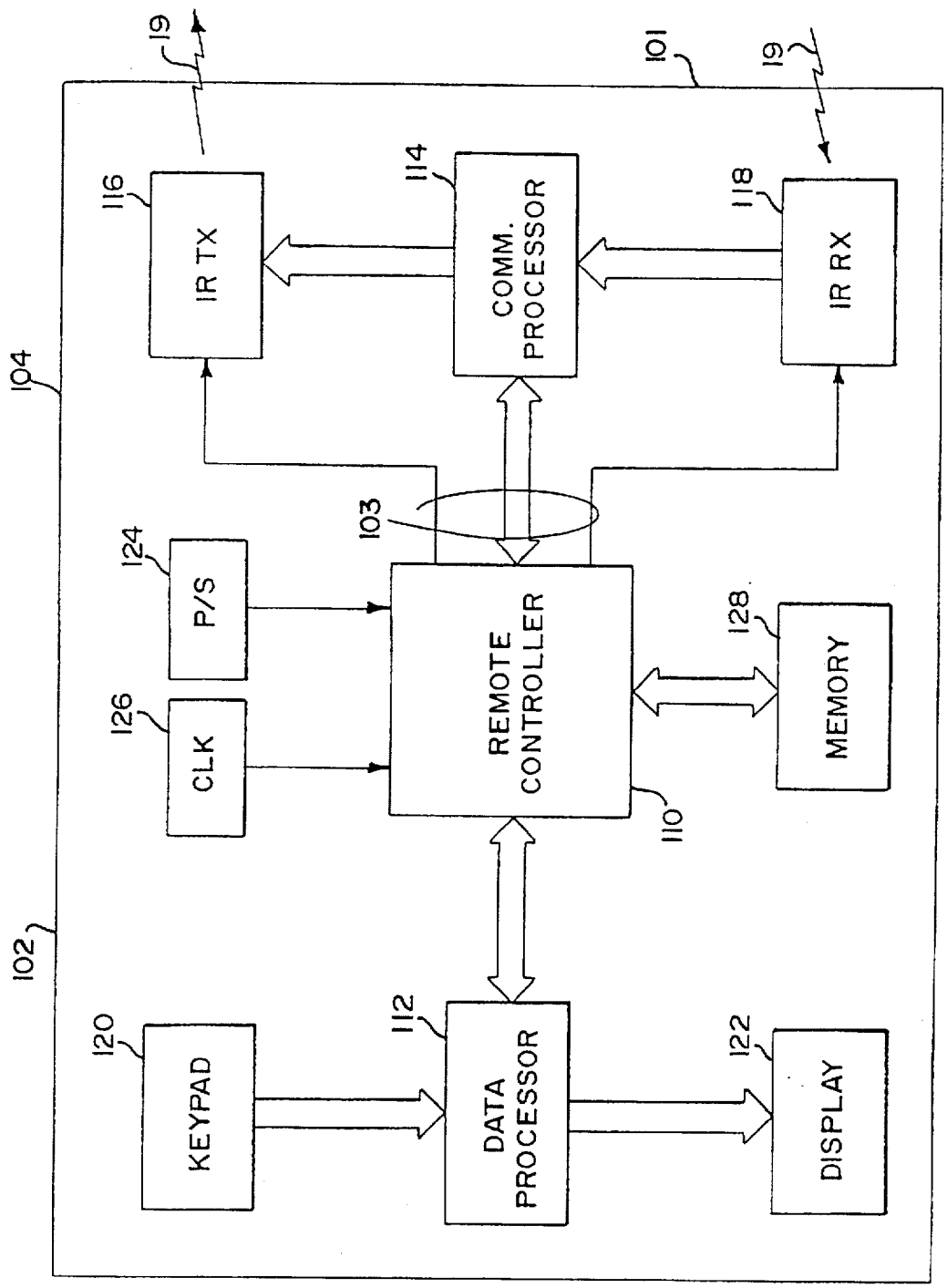
Figure 10:
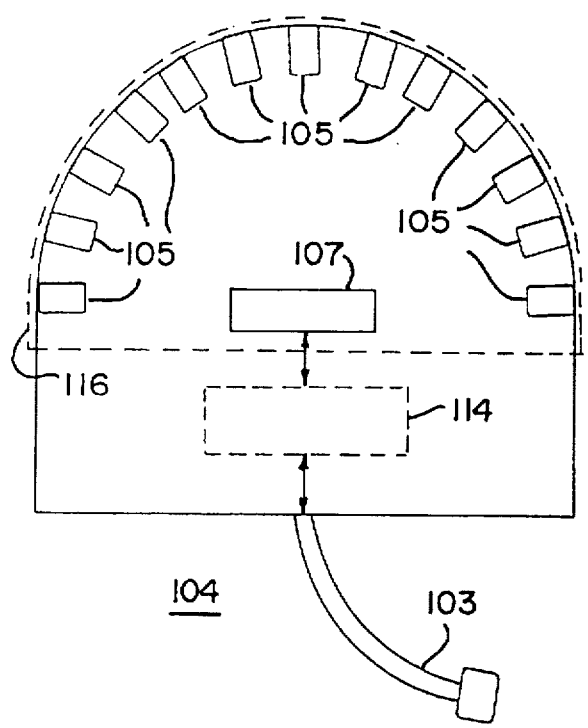
Figure 11:
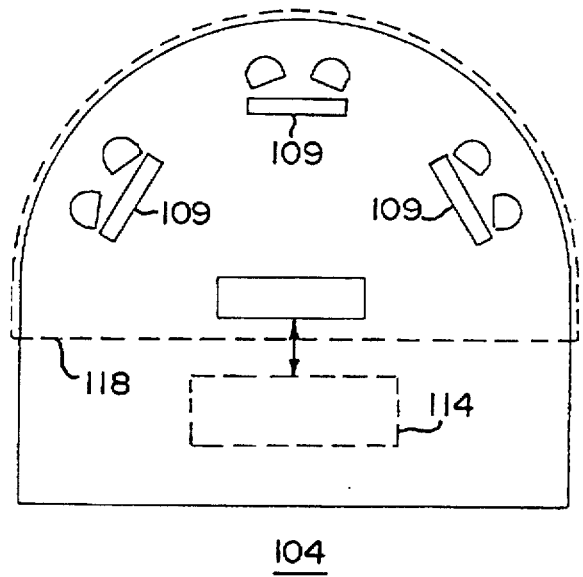
Figure 12:
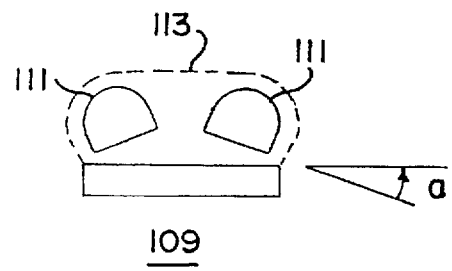
Figure 13:
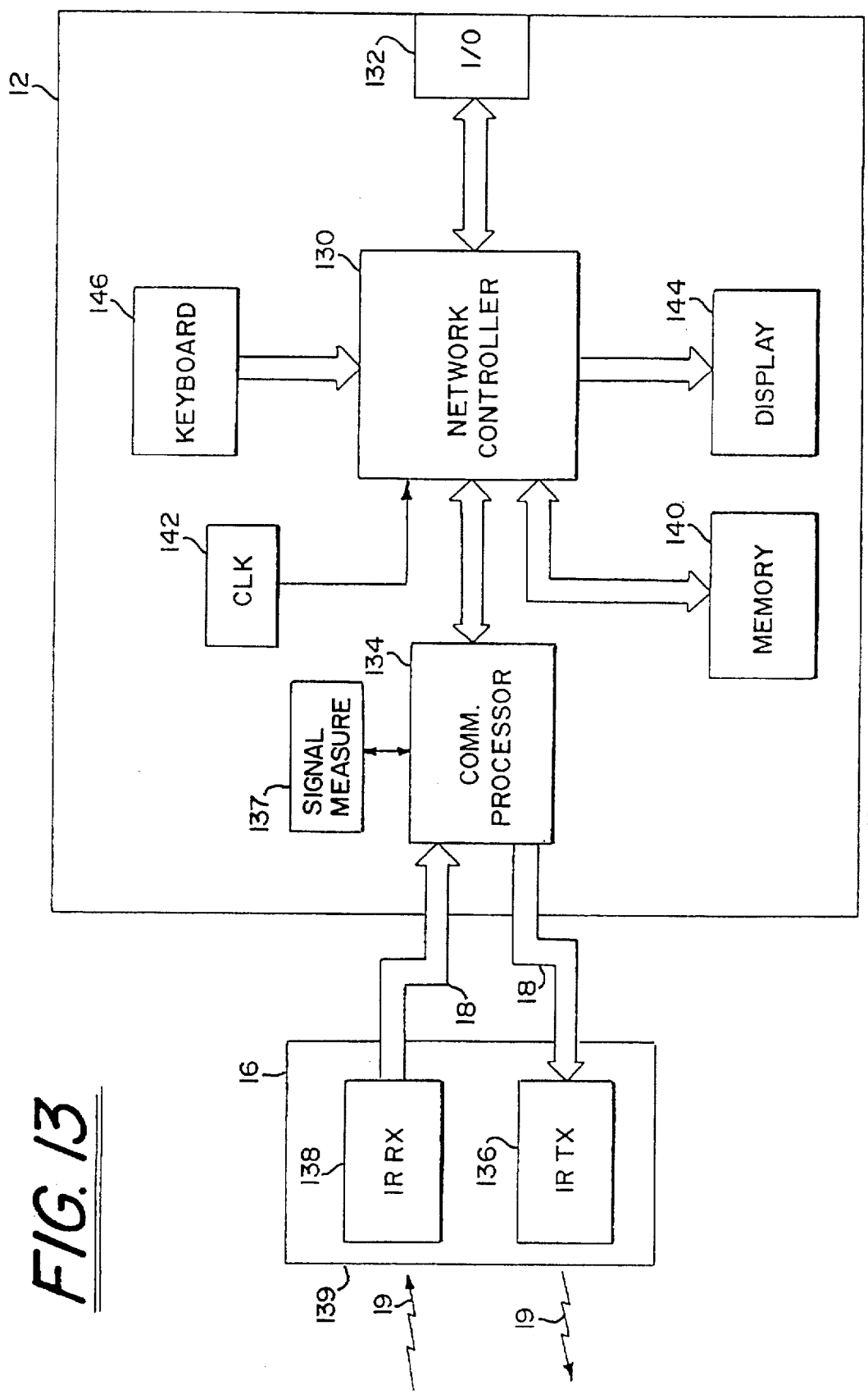
Figure 15:
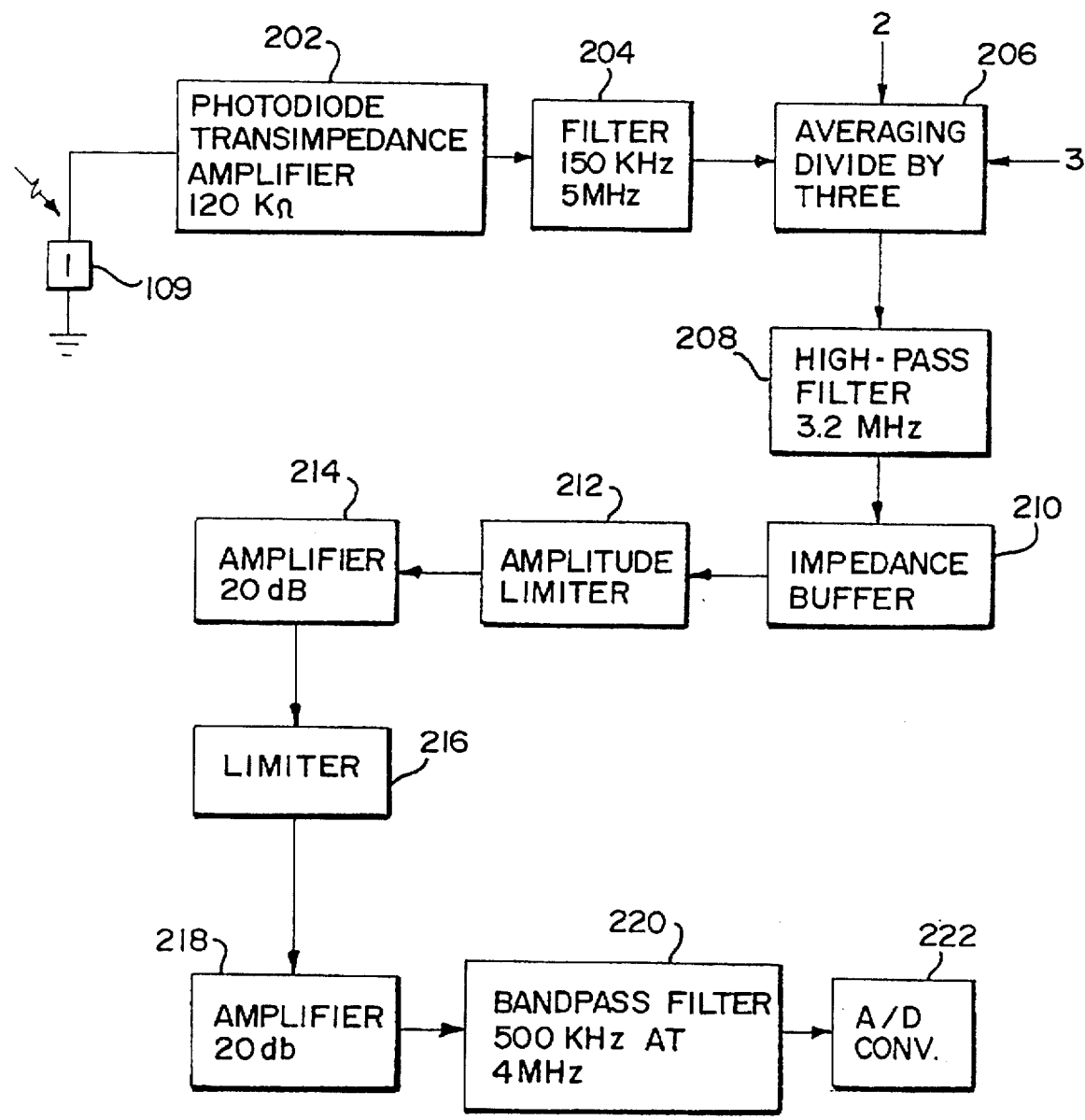
Figure 16:
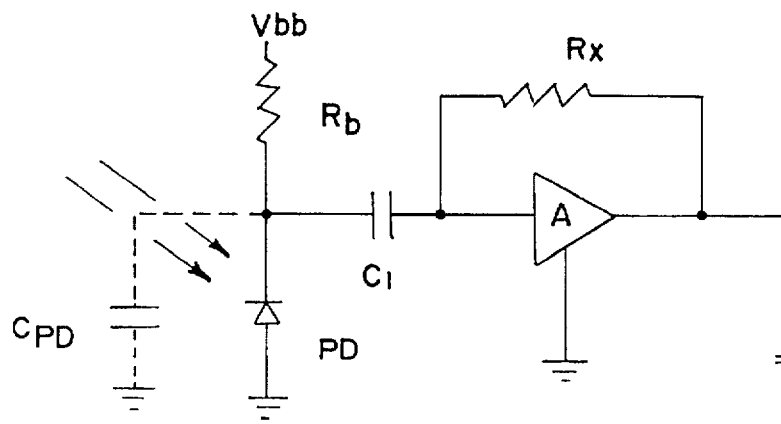
Figure 17:
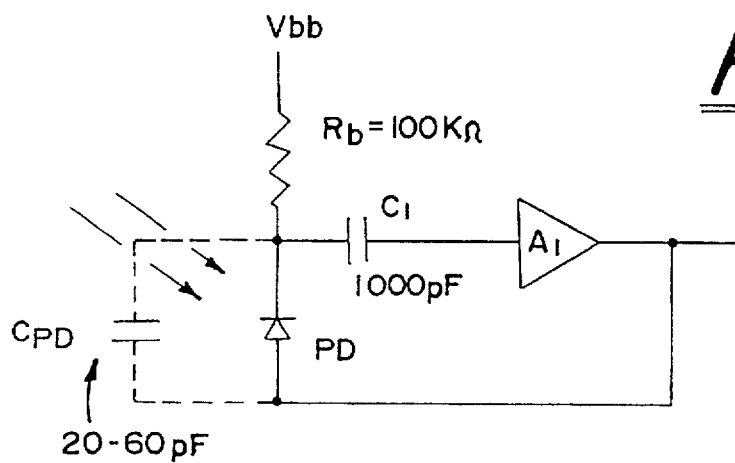
Figure 18:
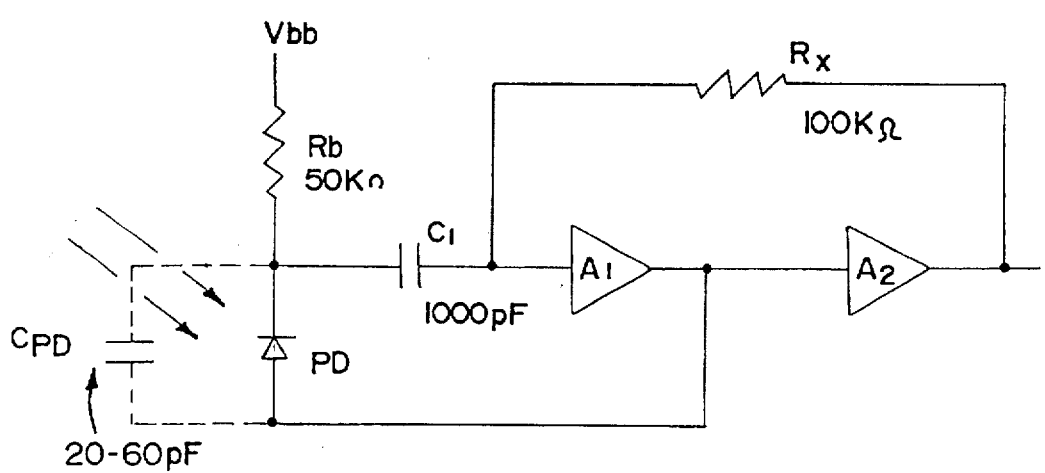
Figure 19:
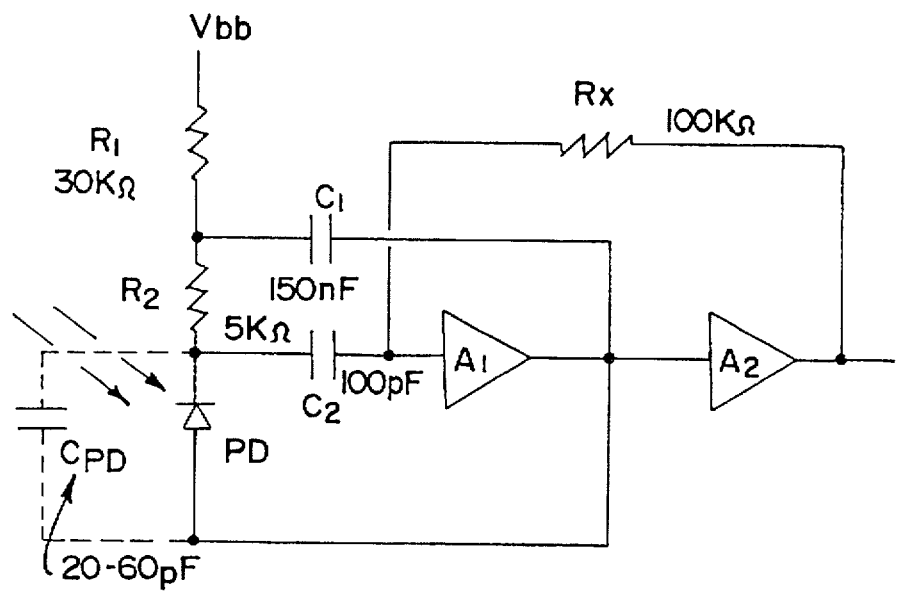
Figure 20:
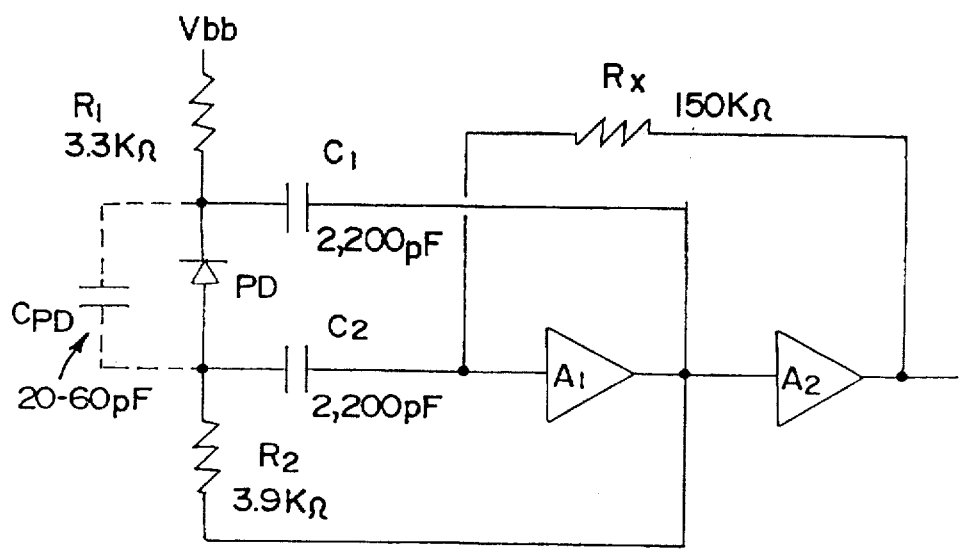
Figure 21:
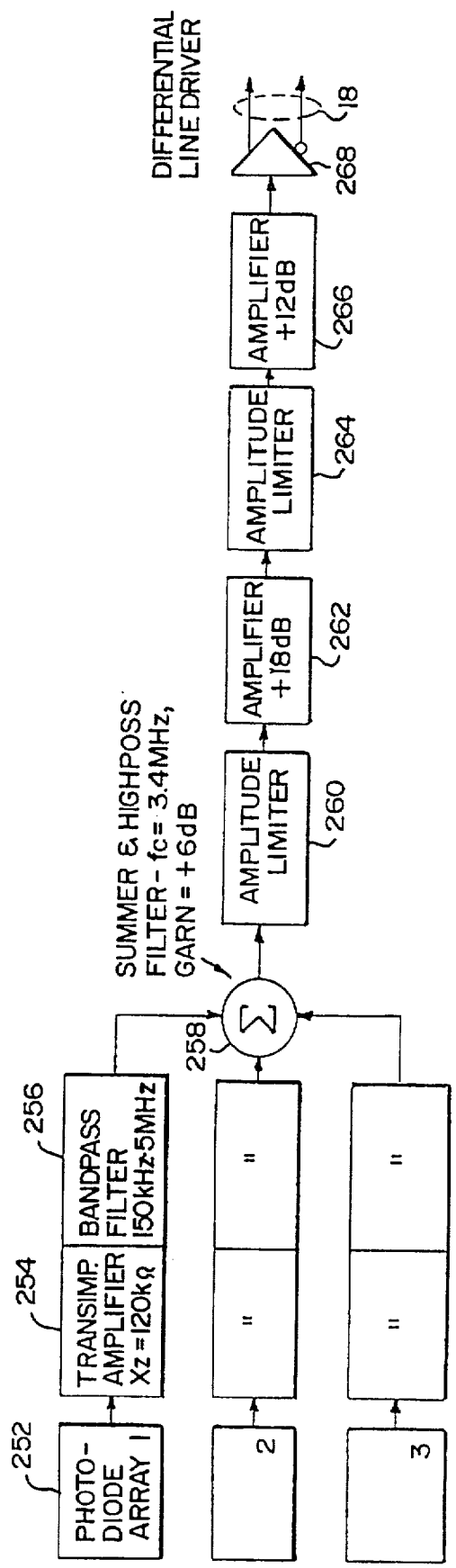
Figure 22:
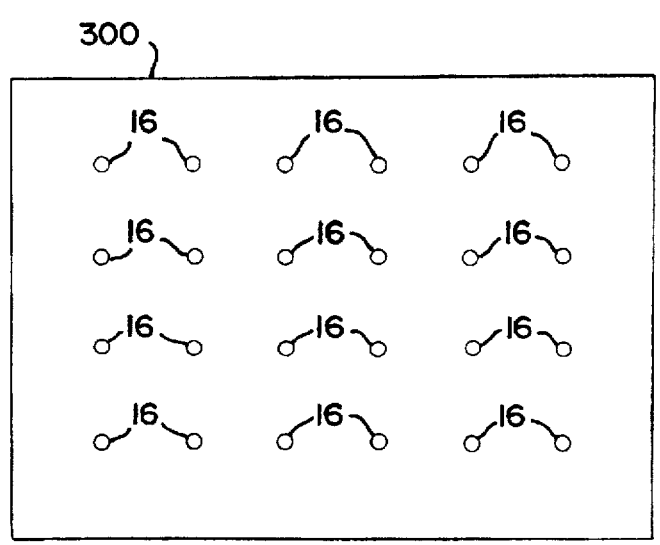
Figure 23:
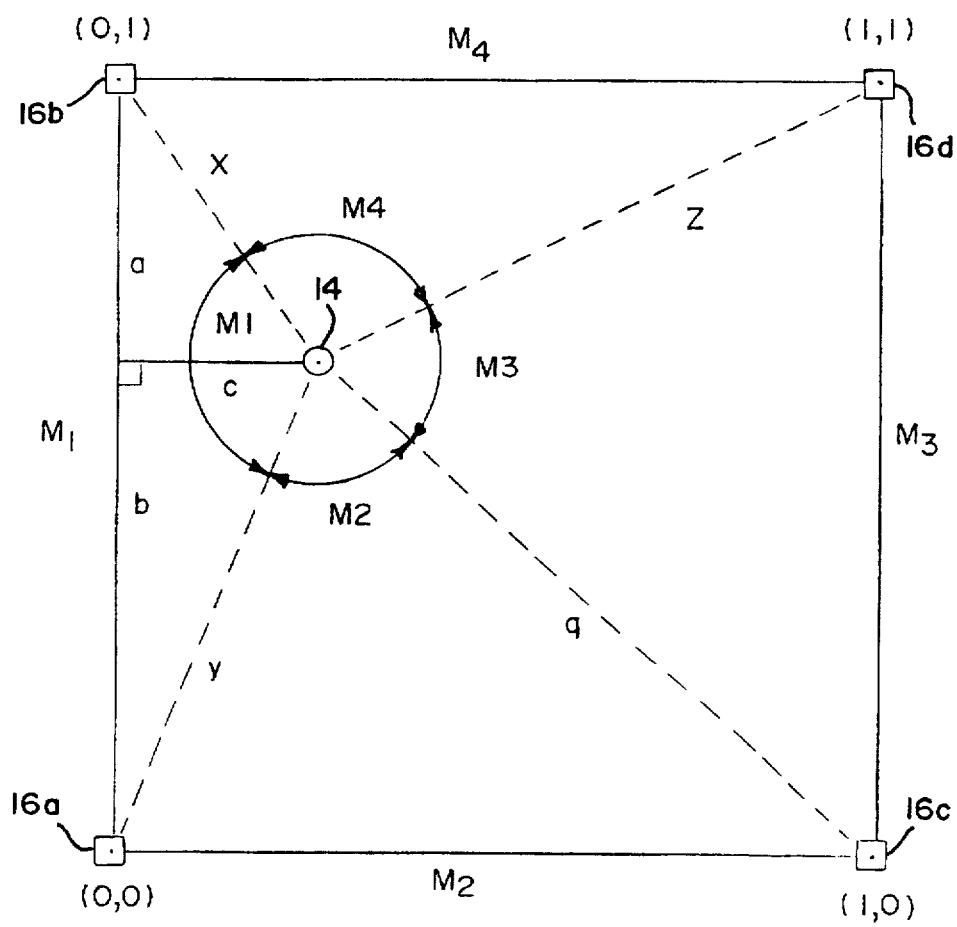

FIG. 7 is a timing cycle diagram similar to that of FIG. 6, wherein acknowledgement signals are returned to the remote stations after each data message;

FIG. 8 is a perspective view showing the general block diagram of the wireless data communication network of FIG. 1 in the context of use;

FIG. 9 is a detailed block diagram of one of the remote stations of the data communication network shown in FIG. 1;

FIG. 10 is a perspective top view of a transceiver section of the remote station of FIG. 9;

FIG. 11 is a perspective bottom view of a transceiver section of the remote station of FIG. 9;

FIG. 12 is a perspective side view of a photodiode module of the remote station of FIG. 9;

FIG. 13 is a detailed block diagram of the central station of the data communication network of FIG. 1;

FIG. 14 is a perspective top and side view of the stationary transceiver of FIG. 13;

FIG. 15 is a block diagram of IR signal processing occurring within FIG. 9;

FIG. 16 is a prior art photodiode transimpedance amplifier;

FIG. 17 is a floating photodiode amplifier of FIG. 15;

FIG. 18 is an alternate embodiment of the floating photodiode transimpedance amplifier of FIG. 17;

FIG. 19 is another alternate embodiment of the floating photodiode transimpedance amplifier of FIG. 17;

FIG. 20 is a third alternate embodiment of the floating photodiode transimpedance amplifier of FIG. 17;

FIG. 21 is a block diagram of IR signal processing occurring within FIG. 13;

FIG. 22 depicts a top view of a enclosed area containing a number of stationary transceivers of the network of FIG. 1 and FIG. 23 depicts a top view of a remote station and four stationary transceivers of the network of FIG. 1.

Figure 24:
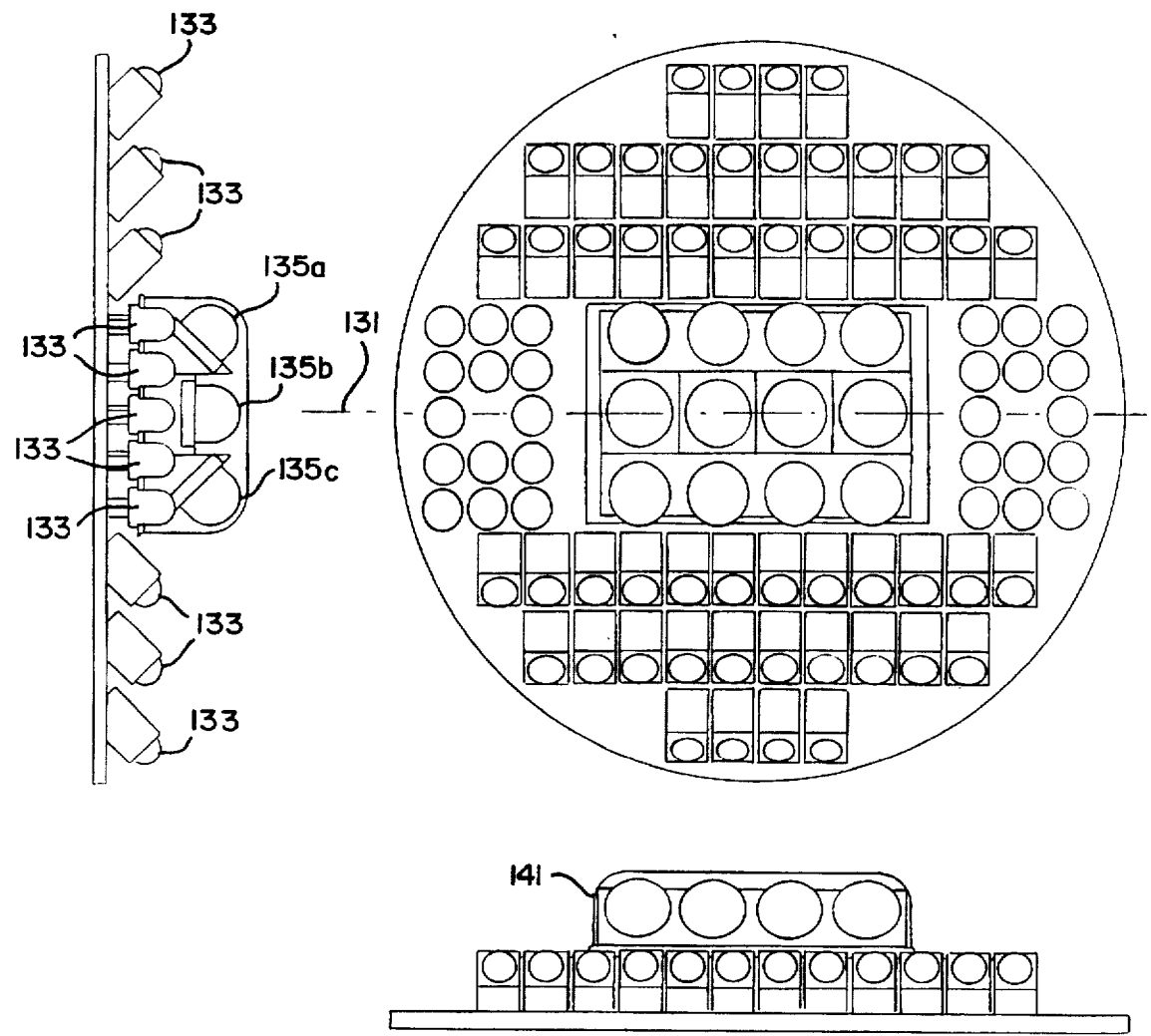

FIG. 24 depicts top and side views of the stationary transceiver of FIG. 13 under an alternate embodiment of the invention.

DETAILED DESCRIPTION OF THE PREFERRED EMBODIMENTS

The solution to the problem of communication between a central station and a plurality of remote stations within an enclosed area, such as a hall or auditorium in a mobile context, without the problems associated with electromagnetic interference lies, conceptually, in the use of diffuse infrared signals. Infrared transceivers disposed within a transceiver section of a remote station and within an at least one stationary transceiving devices distributed around the periphery of the enclosed area and interconnected with the central station are used for the exchange of such signals. The remote stations and stationary transceiving devices are constructed to sense and detect diffuse infra-red (IR) signals received not only directly (line-of-sight), but also signals that may be reflected from the wall (or walls) of the enclosed area or from objects within the enclosed area.

Referring now to FIG. 1, a simplified general block diagram of a wireless multipoint data communications system 10 is shown. The system comprises a central station 12 and a number of remote stations 14. The central station 12 may be a stand-alone data processing and control entity or may be an access point (AP) used in conjunction with other data processors and systems over a larger hard-wired network.

Central station 12 communicates with remote stations 14 through optical infrared transceivers 16 coupled to the central station via a hard-wired link 18. While stationary transceiver 16 is shown in FIG. 1 as a single station, it is to be understood the transceiver 16 may actually (depending on a size of an enclosed volume of spaced in which the system 10 is used) be comprised of a number of transceivers distributed throughout a transmission space. For simplicity, infrared transceiver 16 will be described in terms of a single infrared transceiver station.

Each of the remote stations 14 includes an optical infrared transceiver which communicates with the central station by sending and receiving data messages over an infrared link 19. Depending upon the type of network, the central station may utilize the data messages itself, or route the data messages on to a different station in a local area network.

In the preferred embodiment, each of the remote stations is a portable, hand-held, battery-powered computer having an integrated infrared transceiver, as will be described in detail below. The remote stations may also include a keypad for data input, and a display for data output. Although the present invention is particularly adapted for two-way communication over a single-frequency infrared channel transmitting data packets in the half-duplex mode of operation, the present invention can also be used in a full duplex mode over multi-frequency channels. In the preferred embodiment, infrared link 19 has a 4 Megabit per second data rate using Return-To-Zero with Bit Insertion (RZBI) encoding scheme. However, the present invention is not limited for use with only wireless links or the particular type of channel or data communications scheme shown here.

FIG. 2 illustrates the specific channel frame format 20 used under the protocol for all information transfer and supervisory commands. The frame format of the invention basically follows the High-level Data Link Control (HDLC) data communication line protocol specification of the CCITT, or the Synchronous Data Link Control (SDLC) protocol specified by IBM. Hence, the published detailed specifications for the HDLC or SDLC protocols may be referred to for a further understanding of the common subject matter.

As shown in FIG. 2, each frame is subdivided into a number of individual fields, wherein each field is comprised of a number of 8-bit bytes. The following paragraphs describe channel frame format 20:

Preamble (PRE) 22: This field is a 3-byte field whose purpose is to provide a means of establishing bit synchronization of the receiver with the received signal including the clock recovery signal. The value of the preamble is typically chosen to have a high content of transitions (e.g., "FFFFFF" because in RZBI encoding each "1" bit provides a high-low transition).

Start Delimiter (SD) 24: The purpose of the SD frame is to provide byte synchronization within the receiver. The 8 contiguous bits of the pattern provide a clear indication of the boundary between the "1" bits of the PRE and the bits of the SD. It is a unique "illegal" data structure because the bit insertion of the modulation scheme prevents this number of contiguous zero bits from occurring within the data (anyplace between the SD and ED fields).

Destination Identifier (DID) 26: This field contains the 2-byte address of the station to which the frame is being sent. In other words, in a polling frame, the DID field of a frame transmitted to a remote station first identifies the particular remote station being polled by the central station and then the DID field of a return frame identifies the central station as the destination for the data message being returned by the remote station. Each of the stations is assigned a unique identification code, or address. The remote stations typically receive a new DID address each time the remote station registers with the network 10. However, a dynamic address determination procedure could also be used where the DID address changes during a data exchange under some need-based algorithm. In the preferred embodiment, the addresses of remote stations (non-controller stations) begin with 0000 hex and increase to a maximum amount determined by the number of remote stations allowed in the network (e.g., 7FFF hexadecimal). Controller stations (e.g., central station 12) may be assigned other numerical values (e.g., 8000-EEED hexadecimal). A value of FFFF hex in this field denotes a broadcast frame, which would be received by all stations.

Source Identifier (SID) 28: This field is the 2-byte address of the station sending the frame. To ensure the integrity of the data being transmitted, both the destination and source addresses are included within each frame.

Type Field (TYP) 30: The 1-byte field indicates to the receiver how to interpret a frame's content and in effect provides a control function. A summary of the possible types of frames are as follows: RSYNC, MRSYNC, RegRTS, RTS, FORF, DSYNC, EDSYNC, RegCTS, CTS, DATA, MDATA, and ACK. The meaning and content of the types of frames listed may be best understood by reference to FIGS. 4A–C. The use of the frames may be best understood by reference to subsequent sections.

Control Flags (CTL) 32: This is a 1-byte control field containing bit-mapped flags, primarily used for supervising commands. In the preferred embodiment, control field 32 includes priority flags and retransmission flags, which will be described below.

Information (INFO) 34: This is a variable length field used for transferring data. The INFO field 34 is also used in conjunction with certain types of frames (e.g., RSYNC, MRSYNC, DYSNC, and EDSYNC) as a repository for an indicia of epoch location (e.g., the location of upward data transfer period (upward period), broadcast period, and downward data transfer period (downward period) within the overall data exchange period (data period)).

Frame Check Sequence (FCS) 36: This 4-byte field is used to detect bit errors which may occur during transmission. In the present embodiment, a 32-bit cyclic redundancy check (CRC) algorithm is used to detect errors in fields 26, 28, 30, 32, and 34.

End Delimiter (ED) 38 and Postamble (Post) 40: The purpose of the ED 38 is to allow the receiver to detect an end of frame. The purpose of the POST 40 is to prevent the receiver from mistaking an ED/POST combination for an SD/DID combination in that the hexadecimal value of OEEEE would be an invalid DID.

FIG. 3 illustrates a repeating frame structure (superframe) used by the system 10 to exchange information between the central station 12 and the remote station 14. Each frame making up the superframe has the frame format described above.

Superframes are not always of the same temporal length. The superframe, in turn, may be divided into a variable length period used for receipt of access requests (request period) 50 and a variable length field used for data exchanges (data period) 51.

The central station 12 identifies the beginning of the superframe to the remote stations 14 by transmission of a request synchronization (RSYNC) frame or a mandatory request synchronization (MRSYNC) frame 52. (The RSYNC frame requires only those remote stations 14 desiring access to respond while the MRSYNC requires all remote stations 14 to respond.) The remote stations 14 identify the RSYNC or MRSYNC frames by reference to the type field of the frame (FIGS. 4A–C). In addition to identifying the beginning of the superframe, the RSYNC or MRSYNC frame 52 provides information within the INFO field 34 (FIG. 4A) relative to the number and type of slots (slots using a non-contention based access protocol or a contention based access protocol) within the request period 50. The slot information is used by the remote stations to facilitate system access (to be explained later) or to power-down during the request period 50 if the remote station 14 does not need access to the network 10.

Following the request period 50, the network 10 enters a data period 51. The central station 12 identifies the beginning of the data period 51 to the remote station 14 by transmission of a data descriptor frame 53 (e.g., a data synchronization (DSYNC) or extended data synchronization (EDSYNC) frame). Contained within the INFO field 34 (FIG. 4A) of the DSYNC or EDSYNC frame 53 is temporal information relative to the length of each subsection of the data period 51. The temporal information, as above, is used by the remote stations 14 to reduce a duty cycle of activation by powering-down during appropriate portions of the data period 51.

In accordance with an embodiment of the invention, the slots of the request period are divided into two groups where a first group of slots allows for random access under a contention based protocol (contention slots) and a second group of slots allows for access under a non-contention protocol (reserved slots) (e.g., under an implied polling protocol). Under the invention, the number of contention slots may be constant or may vary based upon an estimate of the number of unregistered remote stations within the service coverage area of the network 10. The number of reserved slots, on the other hand, is adjusted based upon loading. When a remote station 14 is first activated the remote station 14 is granted access to the network 10 under a two-step process. First the remote station 14 transmits an access request within a contention slot. The central station 12, upon receipt of the access request within the contention slot then, as a second step, assigns the remote station 14 to a non-contention slot before finally granting access.

The remote station 14 first monitors for a RSYNC or MRSYNC frame 52. Since the remote station 14 does not yet have a reserved slot, the remote station 14 must access the network 10 through a contention slot. The remote station 14 identifies contention slots by examining the contents of the INFO field 34 of the RSYNC or MRSYNC frame 52. Contained inter alia within the INFO field 34 of the RSYNC or MRSYNC frame (FIG. 4A) is the total number of slots in the request period and the total number of reserved slots. By knowing the location of the reserved and contention slots relative to the RSYNC or MRSYNC frame (e.g., the non-contention slots may immediately follow the RSYNC or MRSYNC frame), the remote station 14 can determine the location of the contention slots. Access may then be secured through a randomly selected contention slot.

By way of example, FIG. 5 depicts a request period having 10 slots. If the reserved slots were designated as being slots 1–7, then slots 8–10 would be the contention slots. An INFO field 34 of an RSYNC or MRSYNC frame 52 in such a case would indicate a total slot number of 10 and a total reserved slot number of 7. Using known methods, the remote station would then randomly generate a number in the range of 1 to 3 and add the randomly selected number to 7 for a final determination of the contention slot to be used in requesting access.

In requesting access to the network 10, the remote station 14 sends a registration request to send (RegRTS) frame (FIG. 4B) within the selected contention slot. The INFO field 34 of the RegRTS frame contains a 48 bit address of the requesting remote station 14 along with coding within the type field that the frame is a RegRTS frame.

Upon receipt of the RegRTS from the remote station 14 by the central station 12, the central station 12 verifies by reference to a memory (not shown) that the address of the remote station 14 is one that is authorized to access the network 10 and that the remote station 14 has a software version compatible with the network 10. Upon verifying that the remote station 14 is an authorized user and is compatible with the network 10, the central station 12 issues a local identifier in favor of the remote station 14. The central station 12, on the other hand, does not immediately transmit the local identification to the remote station. Under the invention the central station waits until the next downward portion of the data period 51 before transmitting the identifier to the requesting remote station 14.

Contained within the local identifier is an identifier of a reserved slot of the request period 50 allocated for use by the remote station 14. The central station 12 may create a reserved slot for the remote station 14 by expanding the length of the request period to 11 slots or may assign the remote station 14 to an unoccupied slot of reserved slots 1–7 (FIG. 5).

Likewise, the central station 12 may de-allocate a slot previously reserved for use by other remote stations 14 based on certain operating parameters. The central station 12 may de-allocate slots for instance where the time since the last use of the slot exceeds some threshold value or if the remote station 14 does not respond to a known number of consecutive MRSYNC frames.

During the next downward period of the data period 51 the central station 12 transmits the local identifier to the remote station 14 through use of a registration clear to send (RegCTS) frame (FIG. 4B). Upon receiving the RegCTS, the remote station retrieves the local identifier and, using the retrieved local identifier, may transmit a Request to Send (RTS) within the designated reserved slot under an implicit polling format during the request period 50 of the next superframe.

Under an alternate embodiment, the remote station 14, upon receipt of a RegCTS may immediately respond by transmitting data. Alternately, a central station 12 may transmit a RegCTS at any time to fill "holes" in the request period (e.g., when a remote station 14 is deactivated or leaves the service coverage area of the network 10).

In general, implicit polling is performed during the request period 50, and explicit polling—of only those remote stations which requested access to the channel—is performed during the data period 51.

To initiate the superframe, the central station broadcasts an RSYNC or MRSYNC frame 52 to all the remote stations. The RSYNC or MRSYNC frame is issued periodically, and it defines the start of a number of time slots of the request period. In the preferred embodiment, the central station sends an RSYNC or MRSYNC frame at least once every second. If there is less data to exchange then the superframe would occur more often, but not more often than once every 100 ms. If there were less data than could be transferred within the 100 ms interval, then the communication channel would be idle for a portion of the 100 ms.

Under an alternate embodiment, an RTS of the remote station 14 specifies the number of data frames it wants to send during the superframe. It is then up to the central station 12 to determine how many times a remote station 14 gets polled. For instance, a central station 12 wouldn't let an entire superframe be "eaten up" by a single station if it requests to be polled too often. Once a request period 50 is complete, the central station 12 has a picture of all upward and downward data periods, and it will divide up the superframe equitably.

A central station 12 may indicate within the RTS frame during the RTS/CTS/DATA/ACK sequence how many frames it will send to the remote station 14 during a superframe. During a DATA/ACK sequence, the use of a "more" bit indicates to the remote station 14 that there is more data to be transmitted during the super-frame.

Every remote station has a preassigned waiting period that will begin upon the reception of the RSYNC or MRSYNC frame. These waiting periods are illustrated as time slots TS in FIG. 6, which fill up the remainder of the request period 50.

Since remote station 1 has been assigned the first time slot, it issues a reserved slot request RR frame 54 if it has data to transmit on the channel. Hence, the first time slot has been replaced with the reserved slot request frame $RR_1$ (RTS frame) transmitted from remote station 1. As seen in the example of FIG. 6, no reserved slot request frame was issued in time slot 2 (frame 55), and a reserved slot request frame $RR_3$ was issued from remote station 3 in time slot 3 (frame 56). In the example shown, a maximum number $X-X_c$ (where X is total slots and $X_c$ is contention slots) denotes the number of active remote stations in the network, and, accordingly, the number of preassigned time slots. (See frame 56.) Note that, in this example, the absence of a reserved slot request frame in a time slot represents a negative access request signal to the central station 12. As will be seen below, an alternate embodiment of the protocol always returns either a positive or negative access request signal to the central station upon issuance of an MRSYNC frame.

After every station has been given a chance to make a reservation, the central station will switch to a modified explicit polling mode, wherein it will sequentially issue a CTS frame to every remote station 14 that made a reservation.

Before the central station 12 begins the explicit polling, on the other hand, the central station 12 must describe the data period 50 for the benefit of those remote stations 14 that may wish to power-down for portions of the data period 50. The central station 12 describes the data period 50 to the remote stations 14 by transmitting a DSYNC or EDSYNC frame 53. (The DSYNC and EDSYNC frames differ primarily in the amount of information provided. In general, the EDSYNC allows for a lower duty cycle of remote stations 14.)

If either a DSYNC or an EDSYNC frame 53 is used, then the reader will find via reference to FIG. 4A that the length of the polling period for the upward transmission of data is to be found within the INFO field 34 of the DSYNC or EDSYNC frame 53. A remote station not needing to transfer data to the central station 12 may use the time period specified to deactivate its transmitter and receiver until a point just before the broadcast period, where the remote station 14 must again reactivate its receiver for the receipt of system information during the broadcast period.

As illustrated in FIG. 6, the central station polls the first remote station during frame 60 of the upward period with CTS frame $P_1$, since remote station 1 sent its reserved slot request frame $RR_1$ during frame 54. Immediately upon receiving the poll signal addressed to remote station 1, that station responds with its data packet $DATA_1$ during frame 62. The central station then checks its poll list to determine which remote station is to be polled next. In the example shown, remote station 3 is polled via poll frame $P_3$ during frame 64, and it responds with its data packet $DATA_3$ during frame 66. The polling ends upon the completion of the response of the last station on the list, which, in this case, was remote station 3.

Priority message capability is also provided for in the reservation-based polling and data exchange protocol of the present invention. Recall that the control field 32 of the channel frame format 20 (FIG. 2) includes a number of bit-mapped priority flags. In the preferred embodiment, four levels of priority can be implemented using two priority flag bits. If any remote station had a priority message to send, then that station would set its priority flags to the appropriate priority level, and transmit a reserved slot request RR frame to the central station in its preassigned time slot during the reserved slot request period. Upon receipt of this reserved slot request frame containing priority information, the central station would rearrange the poll list into priority-level order. Accordingly, the central station would poll the remote stations in priority-level order.

The timing cycle diagram shown in FIG. 6 can be used to illustrate the reservation-based polling protocol with priority-level polling. Assume that the time slots $TS_1$, $TS_2$, $TS_3$, (frames 54–56) of the reserved slot request period are sequentially assigned to correspond with three remote stations 1–3. If all three remote stations had non-priority messages to send, then each would send its reserved slot request RR frame during the appropriate time slot, and the central station would poll each remote station in numerical order, i.e., the poll list would appear as: $P_1$, $P_2$, $P_3$. If, however, remote station 3 had a level-one priority message to send, and remote station 2 had a level-two priority message to send, then these stations would indicate such using the priority flags in the control fields of their reserved slot request frames. The central station would then re-order its poll list to appear as: $P_3$, $P_2$, $P_1$. Thus, the remote stations are polled in priority-level order. Numerous other multiple-level priority message schemes can be used with the present invention, a few of which will be described below.

FIG. 7 represents a similar timing cycle diagram to that of FIG. 6, with the addition that an acknowledgement (ACK) frame is transmitted from the central station to the remote station after the reception of each data message from the remote station. In order to send an ACK frame, the central station 12 must, first, correctly receive the data message.

The example of FIG. 7 illustrates that, during the reservation request period, remote stations 1 and 3 have transmitted reserved slot request frames 54 and 56, respectively. Therefore, during the upward data transfer period, each of these two remote stations is polled. As before, a first poll frame $P_1$ is issued from the central station in frame 60, and data packet $DATA_1$ from remote station 1 is returned during frame 62. However, now an acknowledgement frame $AK_1$ is sent from the central station to remote station 1 during frame 63. A similar polling/data transfer/acknowledgement sequence occurs for remote station 3 during frames 64, 66, and 67. As only partially shown in FIG. 7, remote station $X-X_c$ was polled, it transmitted its data packet, and its acknowledgment frame $AK_x$ is shown being returned during frame 69.

If the remote station 14 does not receive an acknowledgement (ACK) from the central station 12 following a data transfer (or does not get polled), then the remote station 14 sends a reserved slot request (RR) during the next request period 50. If the remote station 14 does not get a response after 3 tries, the remote station may try again later or discard the data.

The broadcast period follows the upward period. Any stations which may have deactivated during the upward period must reactivate for the broadcast period. During the broadcast period, data is broadcast from the central station 12 to all remote stations 14. Data frames (FIG. 4C) during the broadcast period are sent with the broadcast DID (i.e., FFFF hexadecimal). Broadcast data frames are not preceded by an RTS/CTS exchange and are not acknowledged by receiving remote stations 14. If there is no broadcast data to be sent from the central station 12 to the remote stations 14, then an EDSYNC frame 53 at the beginning of the data period 51 may be used to indicate a broadcast length of zero.

Following the broadcast period is the downward data period. If the data descriptor 53 at the beginning of the data period 51 were a DSYNC frame, then all remote stations 14 must remain activated during the downward data period.

If, on the other hand, the data descriptor 53 were an EDSYNC frame, then the contents of the EDSYNC would provide advance notification of which remote station(s) 14 would receive data and, therefore, which remote stations 14 would remain activated during the downward data period. Other remote stations 14 not present within the list of the EDSYNC frame may deactivate for the duration of the downward data period.

Data transfer from the central station 12 to the remote stations 14 during the downward period may occur under either of two possible scenarios. The central station may either transmit an RTS and wait for a CTS before transmitting the data, or may simply transmit a data frame and wait for an acknowledgement response. The use of the RTS by the central station 12 avoids the unnecessary transmission of data when the remote station 14 may not be within range of the central station 12. The use of the RTS/CTS exchange, on the other hand, causes more overall data traffic between the central station 12 and remote station 14.

If the remote station received an erroneous data message, then a negative acknowledgment frame would be returned to the central station. If the central station received neither an acknowledgement frame nor a negative acknowledgement frame from the remote station, then the central station would retransmit the same data message in the next superframe.

Where the RTS/CTS/DATA/ACK sequence is used and there is no response to the RTS, or if the CTS is received with errors, or if after the RTS/CTS/DATA sequence, the ACK isn't received, or if the ACK is received with errors, then the central station 12 begins its retransmission with the retry bit of the RTS frame set. On the other hand, where the DATA/ACK sequence is used and there is no ACK received, or if the ACK is received with errors, then the central station begins its retransmission with the retry bit of the DATA frame set.

Depending upon the requirements of the particular data communication system, it may be advantageous for the central station to track and report on the number of active remote stations in the network—whether or not each remote station has a data message to send. For this purpose, the central controller would issue a mandatory request synchronization (MRSYNC) frame to all of the remote stations. When a remote station receives this frame, it responds with an RTS frame if it has data to send, or it responds with a forfeit (FORF) frame if it does not. If a particular remote station does not respond to the global reservation sync frame, then the central station assumes that the particular remote station 14 is not presently active. In this manner, all of the active remote stations will be accounted for by the system without affecting the throughput of the data communication channel.

Periodically, the central station issues a frame (RSYNC, MRSYNC, DSYNC, or EDSYNC) including a superframe number. The superframe number may be used by the remote stations 14 as a functional check of proper operation (e.g., that a particular sleep mode interval did not cause a remote station 14 to miss part of a superframe).

Shown in FIG. 8 is a perspective view of a wireless multipoint data communication system 10, in a context of use within an enclosed area 11 such as a hall or auditorium. As shown in FIG. 8, communicated signals 19 between a remote station 14 may be transceived along a direct path 13 or an indirect path 15 where a transmitted signal is reflected from a wall or walls of the enclosed area before being received by the remote station 14 or stationary transceiver (e.g., stationary transceiver 16a).

Referring now to FIG. 9, a detailed block diagram of one of the remote stations 14 is shown. As described above, each remote station 14 includes a transceiver section 104 which communicates with the central station 12 via an optical-infrared data link 19 and with a data processing section 102 via an RS232 interconnect 103. The heart of the transceiver section 104 of the remote station 14 is a communication processor 114 operating at 32 mHz. Remote controller 110 interfaces with a data processor 112 and the communication processor 114, such that data processor 112 can communicate over the infrared link using the polling protocol described above. In a preferred embodiment, data processing section 102 may be part of an EPSON Model No. H1001BEW hand-held (palmtop) computer.

Communication processor 114 of the transceiver section 104 may be a Field Programmable Gate Array (FPGA) with custom programmed logic provided by Spectrix Corp., of Evanston Ill. (see Appendix I). Communication processor 114, in turn, controls an infrared transmitter 116 and an infrared receiver 118.

Also shown in FIG. 9 is a infrared filter cover 101 that surrounds and protects the transceiver section 104 of the remote station 14. In addition to offering physical protection, the cover 101 functions to increase the sensitivity of the IR receivers 118 by blocking undesired wavelengths (e.g., visible light to U.V.) from a received signal. The cover is constructed of a polycarbonate (e.g., Lexan™ such as that sold by General Electric under part number 141) with a light absorbing material (e.g., a dye such as that sold by General Electric under part number 701055) disposed throughout the material of the cover 101.

A top perspective view of the transceiver section 104 is shown in FIG. 10 with the protective cover 101 removed. Shown in the top perspective view (FIG. 10) of the transceiver section 104 is a phantom view of the communication processor 114 in communication with the IR transmitter 116. The IR transmitter 116 is comprised of IR drivers 107 and IR light emitting diodes (LEDs) 105.

FIG. 10 shows a set of 12 IR transmitters 105 arranged in a semicircle along the top edge of the transceiver section 104, in 15 degree increments. The 12 IR transmitters may be any commercially available light emitting diode (LED) having a high power output and a broad frequency response (e.g., a model number DN304 available from Stanley). The 12 IR transmitters 105 provide a means of transmitting communicated information directly (line-of-sight) to stationary transceiving devices 16a, 16b or indirectly via reflections from the walls of enclosure 11. Under an embodiment of the invention, the IR transmitters 105 transmit information simultaneously to provide a diffuse transmission of communicated information from remote station 14 to stationary transceiver devices 16a, 16b.

FIG. 11 is a bottom view of the transceiver module 104 of remote station 14. Mounted along an outside edge of a baffle of the transceiver module 104, in opposing relation to the palmtop computer 102 is a set of 3 IR photodiode receiving modules 109 (shown in greater detail in FIG. 12). Each module 109 of the transceiver module 104 is disposed in a 53 degree relation to adjacent modules 109 of the transceiver module 104. Arranging the modules 109 in 53 degree relation enhances the ability of the transceiver module 104 to receive and detect IR radiation anywhere within a 180 degree field of view (90 degrees either side of a longitudinal axis of the remote station 14).

To further enhance the field of view of the transceiver module 104, each photodiode 111 of each receiving module 109 is tilted on the module 109 by some enhanced receiving angle "a" (e.g., 11 degrees). The 6 IR receivers 111 may be any commercially available photodiode having a large photo-active area and a broad frequency range (e.g., a model number VTP1150 from EGG Vactec).

To further improve a signal to noise ratio it has been determined that an unexpected improvement of performance of the photodiodes 111 may be achieved by providing an electromagnetic shield 113 around the photodiodes 111. The electromagnetic shield 113 is a commercially available expanded metal copper structure having holes substantially 2.00 mm in diameter.

FIG. 13 is a detailed block diagram of central station 12 of the data communication network shown in FIG. 1. In order to communicate with the remote stations 14, the central station includes a number of external transceivers 16 (for simplicity, only one is shown in FIG. 13). In the preferred embodiment, infrared transceiver 16 is located at a distance from central station 12, since a personal computer is used for the network controller and since the infrared link is limited to the confines of the enclosed area 11. A network controller 130 interfaces an input/output port 132 to a communication processor 134 such that the reservation-based polling protocol of the present invention is used to transmit and receive data from infrared link 19 to I/O port 132 via infrared transmitter 136, infrared receiver 138, and hard-wired link 18. In the preferred embodiment, the function of network controller 130 is performed by an IBM-compatible personal computer using a DOS-based operating system. The personal computer typically includes a memory 140, a clock 142, a display 144, and a keyboard 146.

Under an embodiment of the invention where multiple stationary transceivers 16 are used, the communication processor 134 (FIG. 13) is equipped with a signal measuring device 137. The network controller 130, through the communication processor 134, measures an infrared signal strength (either diffuse or line-of-sight) of each transmitting remote station 14 at each stationary transceiver 16 and selects the stationary transceiver providing the strongest signal measurement. Alternatively, the network controller 130 may select a stationary transceiver 16a, 16b based upon a bit error rate (BER). If a BER is used, the network controller may measure the BER by comparing known sequences (e.g., DID) received from a remote station 14 by each stationary transceiver 16 and selecting the stationary transceiver 16 providing the fewest errors.

Stationary transceivers 16 are each attached to a wall of the enclosed area 11 and protected by a hemispherically shaped cover 139. The cover 139 not only protects the stationary transceiver 16 from damage and contamination, but also serves as a radiation filter by blocking radiation outside the infrared spectrum (e.g., visible light to U.V.). Under an embodiment of the invention, the cover 139 is fabricated of an acrylic (e.g., Plexiglas™ supplied by Autohass of Bristol, Pa. under catalog number 2711—UV Visible Blockout).

FIG. 14 is a perspective view of a stationary transceiver 16 as it would appear mounted to a wall of the enclosed area 11 with the cover 139 removed. For purposes of detecting diffuse infrared signals, at least four of the photodetectors 135 of the stationary transceiver 16 are tilted 45 degrees to either side of a vertical plane 131 orthogonal to the wall of the enclosed area 11. Four other photodetectors 135 are oriented parallel with the plane 131. The photodetectors 135 may be any commercially available photodiode having a large photo-active area and a broad frequency response (e.g., a model number VTP1150 available from EGG Vactec). As with the remote stations 14 the photodiodes 135 are provided with an electromagnetic shield 141 comprised of expanded metal.

The transmitting LEDs 133 of FIG. 14 occupy a similar relationship with respect to the vertical plane 131. The LEDs 133 may be any of a number of commercially available LEDs having a high power output and a broad frequency response (e.g., a model number DN304 available from Stanley).

Photodiodes 135 and LEDs 133 each have an active receiving/transmitting arc of approximately 90 and 40 degrees, respectively. The active spans of each device, plus the tilting of devices by 45 degrees relative to the wall of the enclosed area 11, allows each stationary transceiver 16 to be able to transceive signals omnidirectionally, from substantially any angle passing through the hemisphere defined by the filter cover 139.

Shown in FIG. 15 is a signal processing block diagram for the infrared detector 118 of the remote stations 14. FIG. 21 shows a corresponding signal processing block diagram for the receiver 138 of the stationary transceiver 16. The processing steps used within the receiver 118 and the receiver 138 are functionally equivalent. Explanation of the processing steps will be offered in terms of the receiver 118 with differences related to receiver 138 noted in passing.

Where the term "photodiode" is used in FIG. 15, or "photodiode array" of FIG. 21, it is understood that the term may refer to a number of photodiodes connected in parallel. For example, in FIGS. 11 and 12 reference number 109 is used to refer to a pair of photodiodes connected in parallel. Likewise, in FIG. 14 the four photodiodes arranged in parallel relationship to the vertical axis 131 may be connected in parallel.

The block diagram (FIG. 15) shows signal processing within blocks 202 and 204 for one of 3 photodiodes. Signal processing of the other two photodiodes (inputs 2 and 3 of block 206) are assumed to be the same. Likewise, signal processing within corresponding blocks 254, 256 of FIG. 21 for photodiode array #1 of the stationary transceiver 16 is the same for each of 3 photodiode arrays.

Where the remote station 14 averages the input of the 3 photodiodes within an averaging block 206, the receiver 138 of the stationary transceiver 16 simply adds the inputs of the 3 photodiodes in summer 258. Also, the function of averaging and filtering blocks 206 and 208 of FIG. 15 are shown combined in the summer block 258 of FIG. 21. The receiver 138 also includes a differential line driver 268 which transfers the amplified limited signal through wireline 18 to the communication processor 134 for bandpass filtering and analog to digital conversion.

Referring now to FIG. 15, an infrared signal 19 received by the photodiode 109 is converted from a current signal to a voltage signal within a transimpedance amplifier 202. The voltage signal is bandpass filtered within the filter 204 having 3 dB points at 150 kHz and 5 mHz. Signals from the three photodiodes 1–3 are averaged within an averager 206 by summing and dividing by 3. Low frequency noise is removed by high pass filtering in a high pass filter 208.

After high pass filtering the signal is impedance buffered within a buffer 210 and amplitude limited within limiter 212. The signal is amplified by 20 dB in amplifier 214 and limited again in limiter 216. The signal is then amplified by 20 dB in another amplifier 218 and bandpass filtered in a filter 220 having a center frequency at 4 mHz and a bandwidth of 300–500 kHz. Following the final filtering in filter 220, the signal is converted to the serially transmitted, digital format described above within an analog to digital (A/D) converter 222.

Conversion of the photodiode signal of diodes 1–3 from a current signal into a voltage signal within the transimpedance amplifier 202 may occur under any of a number of conversion methods and through any number of different types of detecting circuits. FIG. 16, in fact, is an example of a prior art detecting circuit. FIG. 16 shows a photodetector PD providing an input to transimpedance amplifier A through coupling capacitor $C_1$. The photodiode PD receives a supply signal $V_{bb}$ through supply resistor $R_b$. Equivalent capacitor $C_{PD}$ (shown in phantom) represents the capacitance of the photodiode PD.

The transimpedance amplifier A is a high gain, inverting amplifier. The transimpedance amplifier A has a feedback resistor $R_x$. The input impedance $Z_{in}$ of transimpedance amplifier A and feedback resistor $R_x$, to a first approximation, equals R/(1+voltage gain of A).

The positive voltage source $V_{bb}$ applies a voltage across the photodiode PD through supply resistor $R_b$ which reverse biases the photodiode junction, causing the photodiode PD to operate in the photoconductive mode. Current passes from the source $V_{bb}$ to ground through a circuit that includes the supply resistor $R_b$ and photodiode PD. When the photodiode PD is subjected to a modulated light source of the correct wavelength, the photodiode PD modulates the current passing through the circuit from the source $V_{bb}$ to ground. The modulated current through the photodiode, in turn, causes a modulated current to be coupled through $C_1$ into the transimpedance amplifier A.

The capacitor $C_1$ acts to couple the modulated current to the input of A while blocking slow and/or large variations in voltage caused by photocurrent changes resulting from changes in ambient (non-signalling) light levels. At signalling frequencies, the reactance of $C_1$ is small compared to the effective input impedance $Z_{in}$ of the transimpedance amplifier $A_1$.

Since the supply resistor $R_b$ is relatively large compared to the input impedance $Z_{in}$ of the transimpedance amplifier A, the supply resistor $R_b$ represents a minor, parasitic shunt path for signal current. Most of the signal current is sunk by the virtual ground formed at the input of A, represented by the input impedance $Z_{in}$.

The output of the transimpedance amplifier A is a modulated voltage which is an analog of the optical stimulus of the photodiode PD. The amplitude of the output voltage is ideally $R_x$ times the current of the photodiode PD.

The dominant limitation on the bandwidth of the prior art circuit shown in FIG. 16 lies in the resistor-capacitor (RC) time constant inherent in the combination of $C_{PD}$ (the parasitic photodiode depletion layer capacitance) and the effective input impedance $Z_{in}$ of the transimpedance amplifier A. Obtaining adequate band-width for the circuit of FIG. 16, when $C_{PD}$ is large, requires an amplifier A with a very high gain at the required bandwidth (this is costly), or a small $R_x$ (this reduces the transimpedance gain).

A large $C_{PD}$ associated with large photo-active areas of photodiodes, together with the value of $R_x$, exacerbates noise characteristics of the transimpedance amplifier circuit of FIG. 6.

The prior art circuit of FIG. 16 is also subject to other limitations which make the circuit of FIG. 16 not appropriate for the system 10 of the present invention. If the circuit of FIG. 16 is subjected to a strong optical source, the photodiode PD can pass a comparatively high current, resulting in the coupling capacitor $C_1$ rapidly attaining an abnormal charge condition (in the sense that it exceeds normal operating parameters for this circuit). The photodiode PD sinks current from the left side of $C_1$ while the resistor $R_x$, connected to the output of the transimpedance amplifier A, sources current to the right side of $C_1$. When the strong stimulus is removed, the only viable discharge path for restoring normal operating voltages to $C_1$ is through the supply resistor $R_b$. Since the supply resistor $R_b$ is relatively large, the long time constant associated with $C_1$ and $R_b$ results in the circuit of FIG. 16 having a very slow recovery time, unacceptable for a high throughput system.

To avoid the problems associated with prior art photodetection circuits under an embodiment of the invention, a floating photodiode amplifier system (FIG. 17) is used as a diffuse infrared signal detector. Amplifier $A_1$ is a non-inverting amplifier having a gain of slightly less than unity and a bandwidth of at least 12 mHz. In the floating photodiode amplifier system of FIG. 17, the anode of the photodiode PD of the receiver 118, 138 is returned to the output of transimpedance amplifier $A_1$. The photodiode PD is reverse biased as in the previous example except that now its anode side is returned, not to a real ground, but to an artificial ground represented by the low impedance output of the amplifier $A_1$. The gain of $A_1$ is chosen to have a value very near, but not exceeding, unity.

The input impedance of the amplifier $A_1$ of FIG. 17 is chosen to be very high (e.g., >200 k$\Omega$). Because of the high input impedance, a modulated photocurrent passing through the photodiode must also pass predominantly through $R_b$, generating, in turn, a modulated signal voltage across $R_b$. Since the voltage source $V_{bb}$ is fixed relative to ground and since one side of the supply resistor $R_b$ is fixed at the supply source $V_{bb}$, it is clear that the modulated signal voltage may be detected at the cathode of the photodiode PD with respect to ground. Capacitor $C_1$ couples the signal voltage to the input of $A_1$. An essentially identical copy of the signal appears at the output of the amplifier $A_1$. Since the anode of phototransistor PD is connected to the output of the amplifier $A_1$, it can be observed that virtually no signal voltage appears across the photodiode PD. With no signal voltage across the photodiode PD, the bandwidth limitation that would otherwise result from the interaction of $R_b$ and $C_{PD}$ does not exist. The signal voltage appearing at the output of the amplifier $A_1$ has an ideal amplitude of $R_b$ times the photodiode current.

While the substantially passive transimpedance gain mechanism of the circuit of FIG. 17 is practical for large photodiode/low speed systems, or for small photodiode/ moderate speed systems, a high bandwidth photodetector amplifying circuit, with adequate transimpedance gain, may prove difficult to construct with the circuit of FIG. 17. Such a circuit may be difficult because the band-width of the circuit is limited by the time constant formed by the product of $R_b$ and the parasitic capacitance at the input of $A_1$ to ground. It may be noted, however, that the circuit of FIG. 17 is largely immune, by virtue of $A_1$'s high input impedance, to the slow recovery problem plaguing the circuit of FIG. 16.

In another embodiment of the diffuse infrared signal detecting circuit (FIG. 18), a second amplifier $A_2$ and feedback resistor $R_x$ are added to the previous circuit. As above, amplifier $A_1$ is a non-inverting amplifier having a gain of slightly less than unity and a bandwidth of at least 12 mHz. The input impedance of A1 should be at least 200 k$\Omega$ and the output impedance less than 200$\Omega$.

Amplifier $A_2$ is an inverting amplifier having a gain of at least 30–40 volts per volt and a bandwidth of at least 12 mHz. The input impedance of $A_2$ should be at least 10–20 higher times than the output impedance of $A_1$.

Operation of the circuit shown in FIG. 18 is very similar to the circuit shown in FIG. 17. The addition of amplifier $A_2$ and feedback resistor $R_x$ serve to impose a virtual ground at the input of $A_1$. The floating photodiode PD, on the other hand, eliminate the parasitic capacitor $C_{PD}$ as a limiting factor because of the very small signal voltage appearing across the capacitor $C_{PD}$. The noise gain of $A_2$ is also reduced for the same reason. From the perspective of the circuit shown in FIG. 17, the virtual ground at the input of the first amplifier $A_1$ of the circuit of FIG. 18 allows for higher bandwidth and higher transimpedance gain than under the circuit of FIG. 17 because it is now the effective impedance of $A_1$, and not the much larger $R_b$, which interacts with the stray capacitance at the input of the first amplifier $A_1$.

FIG. 19 is an IR diffuse signal detector in accordance with another embodiment of the invention. In FIG. 19 the supply resistor $R_b$ has been divided into two smaller resistors $R_1$ and $R_2$. The embodiment seeks to improve the recovery time of the detector of FIG. 18 by dividing $R_b$ into two smaller resistors $R_1$ and $R_2$ where $R_2$ is a small fraction of $R_1$. Capacitor $C_1$, under the embodiment, couples signal voltage from the low impedance output of unity gain amplifier $A_1$ to the junction of $R_1$ and $R_2$. Because $C_1$ and $C_2$ are shorts at the signalling frequency (4 mHz) of the system 10, the signalling voltage at the cathode of the photodiode PD is substantially equal to the signalling voltage at the input of the amplifier $A_1$. Because $A_1$ is substantially a unity gain amplifier, the output of $A_1$ is substantially equal to the input. Because the reactance of $C_1$ is much less than $R_1$ at the signalling frequency, the charge required to change the voltage across $C_2$ is supplied by $C_1$ through $R_2$. Since $R_2$ is relatively small, the time required for the circuit of FIG. 19 to react to changes in ambient light levels is very fast.

While the circuit of FIG. 19 presents a means of signal detection that, at first blush, may appear to be an improvement, the performance of the circuit of FIG. 19 is still less than that desired. While $C_1$ does serve to supply charging current to $C_2$, a new RC circuit has been created through the interaction of $R_1$ and $C_1$.

To solve the problem of the circuit of FIG. 19, the circuit of FIG. 19 is rearranged somewhat in FIG. 20 to provide an embodiment of an IR diffuse detection circuit 202 not subject to time delays caused by coupling capacitors. The alteration is a subtle but critical change. The supply resistor $R_b$ is still present but (as with FIG. 19) split into two smaller resistors $R_1$ and $R_2$.

The embodiment (FIG. 20) uses the photodiode PD to isolate $R_1C_1$ from $R_2C_2$. The result is to produce two almost independent RC time constants, each of which is quite short and, through proper component selection, may be made substantially equal. Because the two RC networks do not overlay one another (as in the previous approach), definite, independent bounds can be placed on the time constants.

In review, it can now be seen that the infrared detection circuits of FIGS. 17, 18, and 20 represent a significant advance of the circuit of FIG. 16. Where the circuits of FIGS. 17, 18, and 20 are combined with the other elements of FIG. 15, the result is a diffuse infrared communication system receiver that is capable of detecting high-speed infrared signals at substantially above 4 mHz, either line of sight or as reflections from the walls of an enclosure 11.

The present invention provides a diffuse infrared local area communication system for a data communication network which efficiently utilizes a single channel even when only a fraction of the users have data messages to send at a given time. The diffuse infrared local area communication system is particularly adapted for use with a large number of portable battery-powered computer devices communicating with a central station via an infrared link.

In another embodiment of the invention (FIG. 22), stationary transceivers 16 are arranged in a grid pattern and used in combination with the controller 12 to determine a location of each transmitting portable remote station 14. Under the embodiment, a signal measuring device 137 measures a parametric value (e.g., signal magnitude, signal travel time, etc.) and of a particular transmission of each remote unit 14 received through each stationary transceiver 16. The controller 12 may make such a measurement either sequentially or simultaneously. Where a single signal measurement device 137 is available at the controller 12, the controller sequentially measures the parametric value at each stationary transceiver 16. Where a signal measurement device 137 is provided for each stationary transceiver 16, the controller 12 may make the parametric measurement simultaneously of the same transmission of the portable remote station 16 through each stationary transceiver 16.

The parametric value measured by the signal measuring device 137 may be any parameter useful for determining a distance of a remote station 14 to a stationary transceiver 16. Where the parametric value is signal magnitude, the magnitude may then be used as an indication of a distance of the remote unit 14 from the receiving stationary transceiver 16.

For example, a diffuse signal propagating outwards from a point source can be thought of as being distributed over a surface of a sphere. As the signal propagates outwards from a first distance $r_1$ to a second distance $r_2$, the sphere becomes larger and the signal is distributed over a larger and larger sphere. The surface area of a sphere of radius $r_1$ compared to the surface area at a radius $r_2$ (and the energy level of a signal propagating outwards from within such a sphere) may be related by the ratio $r_1^3/r_2^3$.

Similarly, a signal transmitted from a remote station 14 may have a first energy level at its source. As the signal propagates from the source, it has the same total energy, but distributed over a sphere propagating from the source in all directions. As the sphere becomes larger as the signal propagates, the detectable signal energy level at any point in space is attenuated in a predictable manner.

Under the embodiment, measured signal energy may be extrapolated into distance through an appropriate algorithm and used directly, or, stored in a look-up table of a memory 140. In locating a portable remote unit 14 (FIG. 23), the controller 12 first measures a signal strength at each stationary transceiver 16 using a signal measurement device 137. The controller 12 selects the four stationary transceivers 16 providing the highest relative magnitude signal readings. By reference to the look-up table within memory 140, the controller 12 determines a distance from each stationary transceiver 16 to the portable remote station 14.

For example, FIG. 23 shows a grid containing four stationary transceivers 16$a$–$d$ and a portable remote station 14. The values x, y, z, q represents distances to the remote station 14 from each of four stationary transceivers 16$a$–$d$, determined by signal measurements.

From FIG. 23, it should be clear that upon determining the values x and y, the remote station 14 could be located on a relative basis. The result would not be sufficiently precise, however, in that with only x and y distances, the controller 12 would not know which side of the centerline $m_1$, between the stationary transceivers 16$a$, 16$b$ the remote station was located. As a consequence, a third highest signal reading from a third closest stationary transceiver 16$d$ also is necessary. The identity of the third closest transceiver allows the controller 12 to determine which side of the centerline ml the remote station 14 is located. The fourth highest signal reading at the fourth closest stationary transceiver 16$c$ is taken as a double-check of calculation accuracy.

Once the values of x, y, and z have been determined, the actual determination of location of the remote station 14 is determined using the Law of Cosines. For example, if the remote station of FIG. 23 were centrally located between the stationary transceivers 16$a$–16$d$ and the spacings of the transceivers along centerlines $m_1$–$m_4$ were equal to 1.0, then the distances x, y, z, and q would all be equal to 0.707. To solve for the angle M1 would involve evaluating the equation as follows:

$$M1 = \mathrm{acos}((x^2+y^2-m^2)/2xy).$$

Solving, using the given parameters, results in coordinates of the portable remote station 14 of (0.5, 0.5) within the grid system shown.

Alternatively, the coordinates of x,y may be solved directly using the Pythagorean theorem. First, the value $m_1$ may be assumed equal to a+b. The distance along the x-axis may be assumed to be the value, c. Using the Pythagorean theorem as follows:

$$a^2+c^2=x^2, \text{ and } b^2+c^2=y^2.$$

Equating produces the equality as follows:

$$x^2-a^2=y^2-b^2$$

But, since $m_1$=a+b, the value b−$m_1$ can be substituted for the value, a, resulting the in the equality as follows:

$$x^2-(b-m_1)^2=y^2-b^2.$$

Solving and simplifying results in a value for b as follows:

$$b=(y^2-x^2+m_1^2)/2m_1.$$

With the value of b for the y coordinate, the determination of the value of the x coordinates, c, is trivial.

Similarly, the location of the remote station 14 could be determined for any location within the grid shown in FIG. 23 based upon signal measurements of any three stationary transceiver 16. To verify the accuracy of the process, the determination of the coordinates of the remote station 14 may be repeated using a second set of stationary transceivers 16b, 16d.

In another embodiment of the invention, signal propagation time may be used as in indication of distance of a remote station 14 from any of the stationary transceivers 16. Signal propagation time may be used as the signal parameter measured as a means of locating a portable remote station 14, as above, using the Law of Cosines, or by use of the Pythagorean theorem.

Under the embodiment, the measurement of position may proceed under a two-step procedure. As a first step a closest stationary transceiver 16 may be approximated based upon the first-in-time reception of a signal transmitted by the remote station 14. A more precise measurement may be obtained by that station transmitting a signal to the remote station 14 which would be immediately be repeated by the remote station 14. The round trip path would provide a measurement of the distance from the closest stationary transceiver 16 to the remote station 14. Dividing the round-trip time in half would also indicate the instant in time when the remote station 14 transmitted its signal. The knowledge of when the remote station transmitted its signal may then be used by the other stationary transceivers 16 to determine a distance from each of the stationary transceivers 16 to the remote station 14, using a time versus distance look-up table, or appropriate algorithm. The precise location may then be calculated, as above, using the Law of Cosines.

In another embodiment of the invention (FIG. 24), the stationary transceivers 16 are modified to become directional receivers of infrared energy. Under the embodiment, groups of photodiodes 135a, 135b, 135c are each provided with their own signal measurement device 137. Providing each group of photodiodes 135a, 135b, 135c with its own signal measurement device 137 allows a single stationary transceiver 16 to directly determine a location of the remote station 14. Further, by comparing the relative measurement of signal strength of each group 135a, 135b, 135c, the controller 12 is able to precisely determine a relative angle of the remote station 14 around an axis 131 passing through a center of the stationary transceiver 16.

For example if photodiodes 135a are tilted 45 degrees with respect to 135b and the first and second group of photodiodes 135a, 135b are receiving exactly the same signal level, then it would be clear that the remote station 14 is on an angle directly between the two groups of photodiodes 135a, 135b. A determination would be made in such case that the remote station 14 is located at 22½ degrees. Similarly, the proportional measurement of signal strength would provide the angle in other cases. Under the embodiment, a look-up table would be used to reference the angle based upon the ratio of readings.

Knowing the angle of the remote station 14 also provides the controller 12 with a means of determining a precise location of the remote station 14 parallel to the axis 131 of the stationary transceiver 16. Since the remote station 14 would in most cases be used in a relatively constant distance from the floor (4–5 feet), a determination of an angle of the remote station 14 around the axis 131 would allow the controller 12 to traverse along the floor, parallel to the axis 131 up to that point where the distance (as extrapolated from signal strength) indicates the remote station 14 is located. For example, if the height, h, above the floor of the stationary unit 16 were known and the distance of the remote station 14 were determined through signal strength measurements to be the value i, then the horizontal distance parallel to axis 131 of the remote station 14 from a point directly below the stationary transceiver would be equal to the square root of $i^2-h^2$.

While specific embodiments of the present invention have been shown and described herein, further modifications and improvements may be made by those skilled in the art. All such modifications which retain the basic underlying principles disclosed and claimed herein are within the scope of the invention.

APPENDIX I

THEORY OF OPERATIONS FOR THE COMM LINK FPGA REV 5.0

January 5, 1994

The device targeted for this design is the Actel 1240A FPGA which has 684 logic modules and a maximum capability of 568 flip flops and 72 I/O pins. The current design consumes 99% of the device's internal resources (683/684 modules) and all of the I/O pins (72/72).

Below is a summary of the background theory and key design issues for the Comm Link FPGA

---

Items of particular interest for the software engineer are denoted by a solid bar in the margin.

Underlined items denote changes from the last revision of the document. Also, much of the address information on the final two pages changed but is not specifically marked.

---

COMM LINK FPGA TOP LEVEL (1)

The top level contains the actual device pins and some miscellaneous support logic. Also included is the top level symbols for an 11 bit counter, a multiplexer for device reads, output latches for various functions, chip selection, and the Comm Link IR Logic which is bulk of the design.

The miscellaneous logic includes some address decoding, interrupt generation and priority setting, and wait state generation.

- Address decoding is summarized in the table at the end of this document.
- Interrupt priority is set as follows (from highest to lowest):

Level 4 - Comm Link IR Controller (end-of-frame receive or transmit interrupt)
    Level 2 - UART interrupt (including RTS change-of-state)
    Level 1 - 11 Bit timer interrupt.

All interrupts autovector to the default locations specified in the Motorola manual. The highest level interrupt present is latched for presentation to the CPU and must be explicitly cleared by the software ISR before another interrupt will be recognized. If nested interrupts are desired, then the ISR should clear the interrupt at the start of the service routine, otherwise it should be cleared at the end of the routine. Note that there are two different levels of interrupt clearing for each interrupt - one specific and one general. Each interrupt source has a clear function associated with it specifically. This may be cleared at any time without affecting nesting. There is a general clear which allows a new interrupt to be recognized - this is the one that affects nesting. The specific interrupt source must always be cleared prior to the general clear otherwise a spurious interrupt of the same type will result. It would seem reasonable for the specific clear to be located at the beginning of the ISR to ensure that it is taken care of, while the general clear might happen as part of the exit ISR framing if non-nested operation is desired. It is strongly recommended that the software install dummy ISR handlers for unused interrupt vector locations that clear the general interrupt. Otherwise, one spurious interrupt could very well block all future interrupts from being registered.

See the description of Interrupt Logic contained on page 31 of the schematic for additional details concerning the RTS interrupt generation.

- Wait state generation occurs for any UART accesses as well as under software control when power-save mode is selected. For UART accesses, one wait states is added to satisfy timing requirements. In the power saving mode of operation, the CPU clock frequency is switched from 8 MHz to 4 MHz and the DTACK line is held deasserted. This forces continuous wait states during which it is impossible for the code to execute. The only way to exit this mode is for an interrupt to occur from one of the above sources. That event automatically releases the DTACK line and switches the clock to 8 MHz. It is the responsibility of the software to restore power-save mode after completion of the interrupt if so desired.

Device inputs include:
A[17:0] - System address bus.
D[7:0] - System data bus.
X1 - Input for one leg of crystal oscillator circuit.
UART_INT - Interrupt line from the UART.
RX_CLOCK - Nominal 4 MHz receive clock recovered from the input data stream.
RX_IN - Received serial data stream.
BUS_GT - Bus grant line from the CPU.
HW_REV[3:0] - Four input lines to enable software read of current board revision level.
RESET - Hardware reset function.
R/W - Read/write line from CPU.
DS - Data strobe line from the CPU.
FC[2:0] - Function code lines from the CPU.
AS - Address strobe lines from the CPU.
TERM_CNT*L - Terminal count indicator from external 16 bit counter
RTS - Request to Send input from the serial port
SDO - Serial Data Output pin reserved for the Actel ActionProbe system. Tristated during normal system operation.

Device outputs include:
A[15:0] - System address bus.
D[7:0] - System data bus.
IPL[2:0] - Interrupt lines to the CPU.
TX_OUT - Serial data stream for transmission.
RX_ON - Receiver control line. Active low, tristate otherwise.
LED_ON[2:1] - Latched software addressable control lines to the LEDs active low at reset.
RAM_CE - Chip select line to RAM.
R/W_BUS - Read/write line to all chips except ROM.
W/R_BUS - Inverted R/W_BUS for chips with active low ouput enable
BUS_RQ - Bus request line to CPU for DMA transfers.
UART_CE - Chip select for UART.
DEBUG_CE - Chip select for debug port UART.
UART_RD - Read select line for UART.
UART_WR - Write select line for UART.
ROM_CE - Chip select line for EPROM.
ROM_OE - Read select line to ROM.
SHUTDOWN - Control line for power switching of RS232 level translator transmit stage.
EEPROM_DIO - Data input/output line for feeding the EEPROM.
EEPROM_CLOCK - Output line to feed EEPROM clock input.

CPU_CLOCK - Software controlled switched output for CPU clock input. Default at reset to 8 MHz, switchable to 4 MHz.
DTACK - Data transfer acknowledge to CPU. Presently no wait states are inserted.
AVEC - Auto vector to CPU for interrupt acknowledge cycles. All interrupts are auto vector at this time.
X2 - Ouput to feed second leg of crystal oscillator circuit. Inverted from X1 input.
CNTR_DRV - Nominal 125 kHz or 62.5 kHz clock to feed the input of the external 16 bit counter.
CTS - Clear to Send output for serial link.
DCD - Data Carrier Detect output line for serial link.
RESET - Active high signal for parts requiring that sense, ie. the Signetics UART.

COMM LINK IR CONTROL (2)

This is the top sheet for the bulk of the FPGA design. Major submodules to this sheet include the Comm Link Controller, the DMA Address Generator and DMA Controller, Clock Distribution, Queue Pointers, as well as the actual transmit/receive chain. The major parts of the transmit/receive chain include the Shift Register and Queue, the CRC32 Generator, the Bit Stuff/Unstuff function, the TX Waveshaper, the Data Recovery Function, and Start/Stop Detection. Note that the Scramble/Descramble function was removed due to lack of room.

Some miscellaneous decoding is also included on this page to support the above circuits.

Module inputs include:
AI_[19:15] and AI_[3:1]- The address bus from the CPU.
DIN[7:0] - The system data bus from the CPU.
SER_IN - The receive serial data stream.
BG*L - CPU bus grant signal.
AS*L - Address strobe line from the CPU.
RESET*L - Hardware reset line.
READ*H - Read/write line from CPU.
DS*L - Data strobe line from the CPU.
16MHZ_CLOCK - 16 MHz 50% duty cycle reference input.
RX_CLOCK - Nominal 4 MHz recovered clock.
TERM_CNT*L - Terminal count indicator from external 16 bit counter Module outputs include:
AO_[16:0] - The output address lines needed during DMA transfers.
DOUT[7:0] - The output data lines needed during DMA transfers and register reads.
DMA_OVERRUN*H - Latched status signal available for software reads.
DMA_TIMEOUT*H - Latched status signal available for software reads.
CRC_ERROR*H - Latched status signal available for software reads.
SER_OUT - Output serial data stream for transmission.
DMA_ADDR_OE*H - Output enable for address lines during DMA.
DMA_DATA_OE*H - Output enable for data lines during DMA.
RX_ON*L - Control line for receiver control.
RAM_CE*L - Chip select for RAM during DMA.
RAM_WE*L - Read/write control for RAM during DMA.
BR*L - Bus request line for initiating DMA transfers.
CPU_CLOCK - Drive for microprocessor clock input. Software controlled switching between 8 MHz and 4 MHz rates.
EOF*H - Latched end of frame interrupt line signalling completion of receive or transmit.
125 kHz - 8 MHz / 64 to drive general purpose timers with 8us period waveform.
CNTR_DRV - Nominal 125 kHz or 62.5 kHz clock to feed the input of the external 16 bit counter.

CRC GENERATOR (3)

Background:
This circuit implements the IEEE CRC32 polynomial which has the form:
$$X32+X26+X23+X22+X16+X12+X11+X10+X8+X7+X5+X4+X2+X1+1$$
In hex, this translates to 04C11DB7. But, since the circuit assumes that the LSB is transmitted first, the polynomial must be reversed yielding a hex value of EDB88320.

Referring to the circuit diagram, the implementation of the above becomes a 32 bit shift register with 14 XOR gates implementing the polynomial division. The circuit is nominally designed to work with the 4 MHz data rate for the Pineyard project, but much higher data rates should be possible.

The inputs to the module are:
  CLOCK - Nominal 4 MHz clock for driving shift registers,
  CLEAR*L - Low true clear for initializing the registers to zero.
  DATA_IN*H - Serial input data stream, assumed synchronous with CLOCK,
  DATA*H_CRC*L_OUT_SEL - Control input which determines whether the
    output serial data stream is a mirror of the input or whether
    it is the computed CRC data.
  E*L - Enable input for inhibiting the CRC circuit during bit stuffing and unstuffing.

The outputs of the module are:
  DATA_CRC_OUT*H - This is the output serial data stream and it is
    either a mirror of the input stream or the computed CRC data.
  CRC_ZERO*H - Flag bit which indicates whether or not the contents of
    the shift register is zero.

Typical module operation is as follows:
  Prior to starting a CRC calculation, the registers must be cleared
  to a zero state. Then the select line must be set to the data
  position which allows the data to pass through the module to directly
  to the output and also applies the data to the CRC generator as it
  passes through. At this point, data and clock may be applied. The
  data is assumed to be synchronous with the clock (rising edge active)
  and reasonable setup and hold times should be observed. Once the last
  bit of data has been applied to the input, the select line should be
  switched to the CRC position to read the computed value. At this
  point, 32 clock pulses must be applied to shift the CRC data out of
  the registers. The CRC, like the data input, is LSB first.

During transmission, the above method will tag the 32 bit code onto
  the end of the message. Upon reception, the nature of the CRC
  generation process is such that a zero CRC on receive indicates an
  error free transmission process. Therefore, the receiver need not
  specifically look at the code or shift it out of the registers to
  verify whether or not errors occurred in transmission.

ZERO COMPARE (4)

This is a simple zero detection circuit for use by the CRC32 generator to determine whether a CRC fault occurred. A zero result for a CRC32 check on a received message indicates a successful reception.

CLOCK DIVIDER (5)

Background:
The clock divider circuit is essentially just a eight stage ripple counter that effectively divides its input by 256. It is intended as a simple prescaler for other system counters. It also provides the capability to synchronously switch the CPU clock between 8 MHz and 4 MHz and also to synchronously switch the internal state machines between the crystal generated 4 MHz transmit clock and the recovered 4 MHz receive clock. The FPGA internal low skew, high fanout clock drivers are used for the 8 MHz and 4 MHz signals.

The inputs to the module are:
    16MHZ_OSC - Input for the reference oscillator.
    4MHZ_RX_CLOCK - Recovered receive clock input,
    MODE_EQ_RX*H - Control line to switch between receive and transmit clock at 4MHZ output from module.
    HI_SPEED*L - Latch control input to select 8 MHz at CPU_CLOCK output.
    LO_SPEED*L - Latch control input to select 4 MHz at CPU_CLOCK output.
    RESET*L - Clears the eight divider registers to zero and sets CPU_CLOCK output to 8 MHz.

The outputs of the module are:
    8MHZ - Low skew, high fanout reference.
    4MHZ - Low skew, high fanout reference switched between transmit and receive clocks.
    125KHZ - Divided down reference for use by internal and external counters.
    62_5KHZ - Divided down reference for use by external counter.
    CPU_CLOCK - Selectable 8 MHz or 4 MHz reference for driving CPU clock input.

COUNTER DRIVE SELECTOR (6)

Background:
The Counter Drive Selector performs several functions relative to the outboard 16 bit counter located in the DUART.

The first function is to serve as a counter input selection switch. Two input clocks are available: 125 kHz and 62.5 kHz. Given 16 bits, the 125 kHz clock will provide 8 uS resolution over the range of 0 mS to 524 mS while the 62.5 kHz clock will provide 16 uS resolution over the range of 0 mS to 1048 mS. It is of obvious advantage to use the 125 kHz clock input for greater resolution as long as the total segment time is less than 524 mS. The counter drive output defaults to 62.5kHz on powerup.

The second funtion is to automatically start the IR Link transmit or receive process when terminal count is reached. This is accomplished by setting the 16 bit counter for the proper delay and setting up the transmit or receive process as normal but not issueing a GO command. When the terminal count is reached, the high to low transition on the TERM_CNT*L input will cause an 125 nS pulse to be issued to the control state machine to start transmission or reception. In the case of transmission, this is basic a DMA start command. In the case of reception, the GO command turns on the receive circuitry which has finite ramp time. Once the circuitry has ramped up it will start receiving valid messages.

Module inputs are:
    SEL_125*L - Select line for routing 125_KHZ input to CNTR_DRV output.
    SEL_62_5*L - Select line for routing 62_5_KHZ input to CNTR_DRV output.
    125_KHZ - Input for nominal 125 kHz clock.
    62_5_KHZ - Input for nominal 62.5 kHz clock.
    TERM_CNT*L - Active low terminal count indicator from external 16 counter.
    CLOCK - 8 MHz system clock for generating GO pulse to control circuit.

RESET*L - System hardware reset function.

Module outputs are:
    AUTO_GO*L - Output for 125 nS pulse to start transmission or reception.
    CNTR_DRV - Either 125 kHz or 62.5 kHz nominal clock to drive the input to the external
        counter.

11 BIT COUNTER (7)

Background:
The 11 Bit Counter is simple ripple counter designed to work with a nominal
125 kHz input clock. Given that input, the circuit will assert and latch
the output count flag every 10.0 mS. It is intended that this circuit will
be used as a continuously running system clock for general purpose
timekeeping.

At reset, the counting is disabled and the output flag is deasserted. In
order to start counting, the software simply needs to write to the enable
address. The correct count is set in hardware, and the counter
automatically reloads when the terminal count is reached. Assuming that the
output flag is used to generate an interrupt, the interrupt service routine's
only requirement is to clear the interrupt by writing once again to the enable address. Counting
continues whether or not the interrupt flag is cleared. This is done so that elapsed time remains
correct. If desired, the counter can be disabled by writing to the appropriate address. This also
clears an interrupt if there is one.

The module inputs are:
    CLK - Nominal 125 kHz input needed for 10mS time between interrupts
    ENABLE*L - Starts the counter, clears the interrupt.
    DISABLE*L - Clears the interrupt, stops the counter
    RESET*L - Intended for use by the system hardware reset function.
        Deasserts the output count done flag and disables counting.

The module output is:
    DONE*H - Asserted upon reaching the terminal count, deasserted by
        asserting ENABLE*L, DISABLE*L, or RESET*L.

Typical module operation is as follows:
    The boot code should install the necessary interrupt service routine
    and then enable the counter to start. When interrupts occur, the
    service routine needs to service it within 10mS in order not to lose
    elapsed time. The only service required is to deassert the count
    done flag which was used to generate the interrupt.

BIT STUFFER\UNSTUFFER (8)

Background:
    The Bit Stuffer\Unstuffer operates on the serial data stream during
    transmit and receive to guarantee that no more than four 0's occur
    in succession. This is accomplished by observing the data stream
    during transmission and inserting a 1 into the stream immediately
    following the occurence of four consecutive 0's. On reception, the
    reverse is done. The serial data stream is monitored and whenever
    four consecutive 0's are detected followed by a 1, the 1
    is removed from the data stream. See the state diagram for more specific
    this operation.

This process is done on all serial data except for the preamble, start delimiter, stop delimiter, and postamble. In this way, the start and stop delimiters, which are both defined to be 83h, are guaranteed unique values.

It is important to note that the basic circuit only detects the need to stuff or unstuff bits. The actual process of bit adjustment must be accomplished through the use of the control output INHIBIT*H.

To actually accomplish the stuffing and unstuffing, the circuitry external to this module must be clocked as follows:
    stuffing - when INHIBIT*H is asserted, an extra clock pulse must be applied to the stuff circuit without advancing the input data stream ie. inhibit the clock to all circuits prior to the stuff circuit. This allows the stuff circuit to insert a 1 immediately following the four 0's.
    unstuffing - when INHIBIT*H is asserted, an extra clock pulse must be applied to the serial data circuitry preceeding the stuff circuit without clocking the circuitry post the stuff circuit, thereby effectively overwriting one bit.

Note that in both cases the stuff circuit receives an unqualified clock pulse, only the pre and post circuitry have their clock's inhibited.

The module inputs are:
    CLOCK - Nominal 4 MHz transmit and receive clock
    ENABLE*H - Assert to stuff\unstuff.
    CLEAR*L - Clears the internal registers default starting condition.
    STUFF*H - Selects current operating mode, stuff or unstuff
    DATA_IN - Input serial data stream The module outputs are:
    DATA_OUT - The output serial data stream
    INHIBIT*H - Control signal for inhibiting clock to other modules.

Typical module operation is as follows:
    For transmit, prior to the data being applied, the internal registers must be initialized by asserting the clear function and the bypass and stuff line asserted. The input serial data stream containing the preamble and the start delimiter can then be applied along with the clock with the data latched on the clock's rising edge. Once the start byte is clocked through, the bypass line can be deasserted so that the stuffing process can start. The module must be bypassed again when the stop byte is input.

For receive, prior to the data being applied, the internal registers must be initialized by asserting the clear function and the bypass and stuff line deasserted (unstuff mode). The input serial data stream can then be applied. Note that since you cannot tell where the start and stop bytes are, the circuit only unstuffs when there are four consecutive 0's followed by a 1. If there are five consecutive 0's followed by a 1 the data is passed unmodified.

START\STOP DELIMIT DETECTION (9)

Background:
The Start\Stop Detector operates on the serial data stream during only during the receive process in order to delimit frame boundaries.

The primary feature of the module is an eight bit shift register that the serial data stream is clocked through at the nominal 4 MHz IR link rate. The eight bits of the register are compared against 83h for detection of the start\stop delimiter. If detected, the DETECT*L is asserted for one clock period to allow the controlling state machine to take appropriate action.

The module inputs are:
CLOCK - Nominal 4 MHz transmit and receive clock
CLEAR*L - Clears the internal registers
DATA_IN - Input serial data stream The module outputs are:
DETECT*L - Flag which is asserted for one clock period when a 83h is contained in the eight bit shift register.

Typical module operation is as follows:
During transmit this module will be bypassed. During receive, the module should be cleared to prevent any false limit detections. The input serial data stream can then be applied with its associated clock. If a 83h is encountered, the DETECT*L flag will be asserted for one complete clock period to allow the controller circuitry to take appropriate action.

TRANSMIT WAVE SHAPING (10)

Background:
Normal serial data inside the ASIC is in an NRZ (Non Return to Zero) format. The IR Link circuitry requires that the transmit data be supplied in RZ (Return to Zero) format with a 25% duty cycle. This wave shaping is accomplished in this module.

The 4 MHz clock is derived directly from the 8 MHz clock and is used to shift data through the chain to the IR Link. The 8Mhz clock is brought into this module to effectively subdivide each 4 MHz clock period by a factor of four so as to provide a means to achieve the 25% duty cycle. This division by four is accomplished by using both the positive and negative going edges of the 8 MHz clock to drive the wave shaping circuitry at an effective 16 MHz rate.

Referring the TX WAVE SHAPE circuit diagram, the basis of the design is a state machine with two states. The one state asserts the NAND gate so that data can pass to the output. This state is active during the time that that the 8MHz clock is low and the 4MHz clock is high - ie. from the 25% point of a 4MHz cycle to the 50% point for an effective 25% duty cycle. The output is effectively gated off at all other times. This active region is delayed into the 25% to 50% region of the duty cycle to avoid glitched due to the data changing at the coincident rising edge of the 8MHz and 4MHz clocks. In other words, output data is delayed by one quarter of a cycle. Additional gating is provided so that the output is only active during the five states of a Tx cycle that valid data is output. The output is gated off at all other times.

The final output is also inverted from the input to satisfy IR Link transmit requirements.

Module inputs are:
    NRZ_DATA - Input data from the previous circuitry in the ASIC data transmit chain.
    8MHZ_CLK - The system master clock.
    4MHZ_CLK - Derived directly from the master clock, this is used to drive the data into the 4 MHz IR Link.
    STATE[15:11] - Current state indicators for gating output data Module outputs are:
    RZTXDATA - This is the serial data stream that will be output from the ASIC to the IR transmit circuitry.

Typical module operation:
    As described in the background section. This module requires no external control, simply feed it input coincident with the clock and properly shaped data will appear at the output. During receive cycles and transmit cycles where no output data is valid the output is automatically gated off at a high level.

RECEIVER DATA RECOVERY (11)

Background:
    The function of this module is to convert incoming serial data from inverted RZ to NRZ using the nominal 4 MHz receive clock which was recovered from the incoming data stream to shape the NRZ_DATA output.

Any incoming data that has a one to zero transition will clock the first flip flop producing a difference at the inputs to the XOR stage. When the first transition occurs on the RXCLOCK line, this one generated by the XOR will be output while the difference at the XOR inputs will disappear due to the clocking of the second flip flop thereby producing a zero at the XOR outputs. When the second clock arrives, this zero at the XOR output will be clocked to the NRZ_DATA output and the cycle will be complete.

Module inputs are:
    RXRZDATA - The receive serial data stream which is presumed to be inverted RZ formatted data.
    RXCLOCK - Nominal 4 MHz receive clock which was recovered from the receive data stream. This should be used for clocking all subsequent receive functions.
    CLEAR*L - Clears the outputs of all three registers to zero. This should be done prior to an anticipated receive.

Module outputs are:
    NRZ_DATA - The reformatted serial input data.

Typical module operation:
    Prior to a receive sequence, the registers should be cleared to guarantee a zero output as a starting point. The RXCLOCK should then be used to clock the NRZ_DATA output from the module through the rest of the receive chain.

15 BIT DMA ADDRESS COUNTER (12)

Background:
    The DMA Address Counter is a fast, synchronous design counter designed

10/27 for 16 MHz operation. It is designed to be used as
the address generator for transferring network data to and from
local memory.

The following truth table describes the dependency of the various
control lines for the counter:

| CLEAR*L | LOAD_XX*L | CE*L | CLOCK | Q[15:0] |
|---------|-----------|------|-------|---------|
| 0       | x         | x    | x     | 0       |
| 1       | 0         | x    | r     | D       |
| 1       | 1         | 1    | x     | Q       |
| 1       | 1         | 0    | r     | Q+1     |

The farther right in the table the control line appears, the higher
its priority. For instance, if clear is asserted nothing else matters.

Module inputs are:
    CLOCK - 16 MHz maximum signal to increment count, load new value.
    CLEAR*L - Asynchronous clear of counter value to zero.
    LOAD_HI*L - Enable line to load most significant byte of starting
        count on next rising edge of clock.
    LOAD_LO*L - Enable line to load least significant byte of starting
        count on next rising edge of clock.
    D[7:0] - Data input lines for loading new starting count.
    CE*L - Count enable input. When asserted, counter will increment on
        each rising edge of clock subject to truth table conditions
        above.

Module outputs are:
    Q[14:0] - The 15 bits of counter data.

Typical module operation:
    Starting DMA address is loaded by asserting LOAD_LO*L, putting least
    significant byte of address on D[7:0], and providing a low to high
    transition of CLOCK. The same procedure is then followed for the most
    significant byte. Order of high versus low is not important.

To begin counting, assert count enable and apply clock pulses. The
    counter will count up, rolling over at FFFFh if allowed to.

DMA ADDRESS GENERATOR (13)

Background:
    This module contains the 15 bit DMA Address Counter module discussed
    previously plus latches, comparators, and other support logic for
    generating the DMA_END*H interrupt.

The output count generated by the address counter is compared to
    an ending address value written into a 15 bit set of comparison
    latches. If the addresses match, an interrupt is generated if so
    enabled. Otherwise, if the interrupt is disabled, no action is taken.

Note that the interrupt generation logic is gated by the clock such
    that address count increments are done on the rising edge of the
    clock while comparison results which generate the interrupt are only
    sampled on the second half of the clock period.

Module inputs are:
- D[7:0] - The data bus inputs to the module.
- LOAD_HI*L - The latch line for capturing the most significant byte of the starting DMA address.
- LOAD_LO*L - The latch line for capturing the least significant byte of the starting DMA address.
- CE*L - Count enable line for allowing DMA address to increment in the presence of clock pulses.
- CLOCK - Clock input for incrementing DMA address. Must also contain pulses to latch high and lo starting DMA addresses.
- LOAD_HI_CMP*L - Latch line for capturing most significant byte of ending DMA address.
- LOAD_LO_CMP*L - Lathc line for capturing least significant byte of ending DMA address.
- DS*L - CPU data latch line for loading in the starting address into the DMA counter.
- RESET*L - Intended for use by the system hardware reset function. Will disable and clear DMA interrupt.

Module outputs are:
- DMA_END*H - Interrupt generated by comparison circuitry. Will be held high until explicitly cleared.
- A[14:0] - DMA address for outputting to memory.

Typical operation is:
Refer to previous section for Intructions for loading and DMA address counter. An ending address must also be computed and stored by writing the high byte and low byte to the LOAD_xx_CMP*L addresses. At the end of the count sequence, an interrupt will be generated and the controller hardware is responsible for disabling the counter while it is expected that software will clear the interrupt.

The software can read the final DMA address that was used during a receive or transmit sequence by accessing the appropriate registers. For transmit, the final address read will always be equal to the ending address specified prior to the transmit sequence, therefore this feature is of little significance for transmit mode. During receive, however, the final address value is obviously of importance since the message length is not necessarily known in advance. The address read after a receive will be one byte past the actual end of the stored message since the hardware preincrements the address pointer prior to a write cycle. For safety sake, this overrun byte should be left as a minimal buffer and should not be allocated to other data storage.

For transmit, the start and stop addresses should coincide with the the first byte of the three byte preamble and the final byte of the message prior to the CRC code. Hardware will insert the CRC code, the Stop ID, and the two byte postamble.

For receive, the start address will be where the hardware begins assembling the received message beginning with the first byte of the Destination ID. The final address listed should be equal to or greater than the length of message including Destination ID through CRC and Stop ID + 1. In other words, if a write to the final address is attempted, it is considered a DMA Overrun error. Note that if the final address limit is specified as the message length + 1 as suggested, simply reading the final address will be ambiguous as to whether an overrun occurred since both an overrun and a normally terminating transfer would end with the pointer in the same place. In this case, the overrun flag must be checked.

Finally, note that all addresses are assumed to procede from low to high in byte increments, and that all address ranges are assumed to be contiguous.

SHIFT REGISTER AND QUEUE (14)

Background:
This module contains an eight bit shift register and a four byte queue. On receive, data is shifted into the register. When a complete byte is in the register, it should by loaded into the one position of the four byte queue. The queue can then be addressed one byte at a time onto the CPU data bus for storage into local memory. On transmit, the control circuitry loads data from local memory into the four byte queue. Data is then loaded a byte at a time from the queue into the shift register and then shifted out LSB first. At the end of the transmit, multiplexer inputs to the shift register are provided to allow the Stop ID and two byte Postamble to be loaded directly.

Module inputs are:
SER_IN - Serial data input for receive data stream.
SRIN_SEL*H - Shift register input select for routing the queue output to the input of the shift register.
QIN_SEL*H - Selects the CPU data bus as inputs to the queue for transferring data from local memory to the queue.
POSTAMBLE_SEL*H - Selects a byte (EEh) of the postamble (EEEEh) as data inputs to be loaded into the serial shift register.
STOPID_SEL*H - Selects the Stop ID (83h) as data inputs to be loaded into the serial shift register.
SHIFT_CLOCK - Nominal 4 MHz clock to drive the shift register during transmit and receive.
RESET*L - Intended for use by the hardware reset function, this clears the shift register.
BANK_STRB[3:0] - Strobe lines for the four byte queue with data latched on the rising edge.
DIN[7:0] - CPU data bus for writing data from local memory to the queue.
DID_STRB_HI*L - Strobe line for latching the high order byte of the DID into the internal latch.
DID_STRB_LO*L - Strobe line for latching the low order byte of the DID into the internal latch.
RPTR[2:0] - Three bit read pointer input lines. At this time, only the lower two bits are ulitized for the queue function.
E*L - Shift register enable line for use by the stuff/unstuff circuitry to inhibit the shift register clocking.

Module outputs are:
Q0 - This is the serial data output line for use during transmit or for feeding the CRC generator on receive.
DOUT[7:0] - CPU data bus for transferring data from the queue to local memory.
DID_MATCH*H - Non-latched Indicator that the data in the incoming serial data stream matches either the programmed DID or the Broadcast DID.

Typical operation is:
During receive, data is shifted into the serial input of the module coincident with the shift clock. As a complete byte is received, it can be stored in the queue at the current write pointer position (0-3) by asserting the appropriate strobe input. Data can then be transferred from the queue position pointed at by the current read pointer (0-3) to local memory via the CPU data bus. If the incoming data contains a two byte pattern matching either the DID written into internal registers by the software or the Broadcast DID (FFFFh), the DID_MATCH*H indicator will be asserted for as long as the match exists. This indicator is not latched.

During transmit, data is transferred from local memory to the queue at the position pointed at by the current write pointer (0-3). Data can then be transferred from the queue position pointed at by the current read pointer (0-3) to the shift register by asserting the shift register input select while providing a shift clock pulse. The data can then be shifted out of the serial output. At the end of the transmission cycle, the Stop ID can be sent by asserting the Stop ID select while providing a shift clock pulse. After the Stop ID has been shifted out, the postamble can be loaded a byte at a time by asserting the postamble select and providing a clock pulse.

During transmit, software needs to assemble a frame in contiguous memory the includes the three byte preamble and Start ID but does not include the CRC32 code, Stop ID, or Postamble. Hardware will take care of inserting these fields.

DESTINATION ID COMPARISON (15)

Background:
The comparison logic determines whether the sixteen bit word currently input is the same as the DID written into the internal latch by the software or whether it is equal to FFFFh, the Broadcast ID, which is set in hardware.

Module inputs are:
D[7:0] - CPU data bus input for writing the DID into the internal latches.
DID_STRB_HI*L - Strobe line for latching the high order byte of the DID into the internal latch.
DID_STRB_LO*L - Strobe line for latching the low order byte of the DID into the internal latch.
Q[7:0] - Comparision value for high byte of DID derived from input queue circuitry.
Q[07:00] - Comparision value for low byte of DID derived from input queue circuitry.

Module output is:
DID_MATCH*H - Non-latched indicator that the data in the incoming serial data stream matches either the programmed DID or the Broadcast DID.

Typical module operation:
At startup, the hardware initializes the DID comparison register to FFFFh so that only broadcast frames are received. The software is responsible for writing a valid DID into the comparison register. At that point, the DID_MATCH*H output will be asserted as long as a match exists between either the hardware generated FFFFh or the software generated DID value which was written into the comparison latch. <u>The hardware is configured under the assumption that the DID is transmitted MSB first.</u>

OCTAL LATCH (16)

Eight bit octal latch circuit that is used as a building block in other parts of the circuit. Notable only in that the RESET*L function presets all the outputs to a "1" state versus the usual clear to "0".

QUEUE POINTER LOGIC (17)

Background:
    The queue pointer logic includes a two bit counter for the read pointer as well as a two bit counter for the write pointer. The write pointer is decoded via an enabled 2x4 decoder circuit to provide an input strobe to the four byte queue. Logic provides indication of various states of pointer equality including write pointer = read pointer and write pointer equal to upper and lower bounds.

Module inputs are:
    INC_WPTR - This signal increments the write pointer on the falling edge.
    INC_RPTR - This signal increments the read pointer on the falling edge.
    CLEAR_PTRS*L - This clears both the read and write pointers to zero.
    STRB_ENABLE*L - This control input asserts the strobe signal associated with the current write pointer.

Module outputs are:
    WPTR_EQ_0*H - Asserted whenever the write pointer is equal to zero.
    WPTR_EQ_3*H - Asserted whenever the write pointer is equal to three.
    WPTR_EQ_RPTR*H - Asserted whenever the read and write pointers are equal to each other. This value is not latched.

Typical operation is:
   Both pointers normally are cleared to start.

During receive, as data is written into the queue the write pointer
   is incremented. When the queue is full (write pointer equal to three),
   DMA is started which transfers the queue to memory by reading bytes
   from the queue and incrementing the read pointer until it equals
   the write pointer. Both pointers are then cleared and the process
   starts again.

During transmit, the DMA Controller writes data into the queue until
   it is full (write pointer equal to three). At this point, data is
   read byte by byte from the queue into the serial shift register for
   transmission. As it is read, the read pointer is incremented until
   the read pointer equals the write pointer. Both pointers are then
   cleared and the process starts again.

DMA CONTROLLER (18)

Background.
   The DMA Controller is state machine architecture designed to run
   at speeds up to approximately 16 MHz. The controller loops in
   State 0 until it senses that the bus request line has been asserted,
   presumably by the primary Comm Link Controller. Once it has
   determined that the request line has been asserted, it jumps into
   an active mode appropriate for the current DMA activity - TX or RX.
   In the active mode, the DMA Controller assumes responsibility for
   asserting the bus request line. It asserts this line, waits for
   bus grant to occur, and then begins the actual data transfer.

State Summary:
   The following is a summary of the primary action or purpose for
   each state of the controller state machine. Refer to the
   state diagram and schematic for additional detail.

S0 - Idle waiting for DMA request

RX Mode
   S1 - Arbitrate for bus to start queue to memory transfer
   S2 - Setup to read first byte
   S3 - Read byte into the queue
   S4 - Setup to read next byte, loop to S3 or quit TX Mode
   S5 - Arbitrate for bus to start memory to queue transfer
   S6 - Setup to write first byte
   S7 - Write byte out of queue and into memory
   S8 - Setup to write next byte, loop to S7 or quit Module inputs are:
   BR_IN*L - The bus request line output by the main Comm Link
         Controller.
   BG*L - The bus grant line from the CPU.
   MODE_EQ_RX*H - RX or TX mode indicator line.
   AS*L - Address strobe line from the CPU.
   WPTR_EQ_RPTR*H - Queue write and read pointer equality indicator.

WPTR_EQ_4*H - Queue write pointer equal to 4 indicator.
DMA_END*H - End of DMA transfer indicator from DMA address counter.
CLOCK - Nominal 8 MHz clock for the Comm Link.
RESET*L - Reset line from system hardware reset.

Module outputs are:
BR_OUT*L - The bus request line output by the DMA Controller. This is an 'OR' of the bus request function of the DMA and Comm Link Controllers.
DMA_CLOCK - Clock line for driving the DMA Address Generator.
CLR_PTRS*L - Clear line for the queue read and write pointers.
DMA_ADDR_OE*H - Output enable line for address tri-state buffers during DMA.
RAM_CE*L - Chip enable for RAM during DMA.
QIN_SEL*H - Selects the CPU data bus as the input to the queue latches for use during DMA transfer from memory to queue.
TFR_TO_Q*L - Strobe line for writing data into queue during memory to queue DMA transfers.
INC_WPTR - Control line to increment the queue write pointer.
DMA_DATA_OE*H - Output enable line for data bus tri_state buffers during DMA.
RAM_WE*L - Read\write control line for external RAM.
EOT*H - End of transfer indicator.
CE*L - Count enable line for DMA address generator.
INC_RPTR - Control line to increment the queue read pointer.

COMM LINK CONTROLLER (19)

The Comm Link Controller is the primary control mechanism for the IR link logic. It is an 4 MHz state machine with 16 distinct states. Refer to the state diagram(s) for complete details on the controller operation.

The Controller is composed of a number of major modules including the Control State Equation module, the State Register module, and the Global Output equation module. Also included are 2 bit and 6 bit counters necessary for counting the number of bits transferred as well as some latch logic.

One logic item of note is the inclusion of the 2 input multiplexer with associated latch circuit which drives the DID_MATCH*H input to the Control State Equations. This is provided so that software can override the default DID matching circuitry and force the hardware into "promiscuous mode" where it interprets all received DID's as valid matches.

STATE SUMMARY

The following is a summary of the primary action or purpose for
for each state of the controller state machine. Refer to the
state diagrams and schematic for additional detail.

S0 - Idle waiting for GO command

RX Mode
S1 - Search for received Start ID
S2 - Receive first byte of DID
S3 - Receive second byte of DID
S4 - Receive balance of the frame
S5 - Handles case of STOP ID detection occuring within S6 instead of S4.

S6 - Wait for DMA Controller to release bus signalling end
of queue to memory transfer, loop to S4 or end.

TX Mode
S7 - Assert Bus Request which also signals DMA controller to start
S8 - Wait for DMA Controller to release bus signalling
  that transmit queue is filled
S9 - Transmit 3 byte preamble.
S10 - Transmit Start ID while waiting for DMA Controller to fill
  transmit queue from memory to start normal operation
S11 - Wait for DMA Controller to fill transmit queue during normal memory to queue
  transfer
S12 - Transmit balance of frame
S13 - Transmit CRC32
S14 - Transmit Stop ID
S15 - Transmit 2 byte postamble

CONTROL STATE EQUATIONS (20)

This logic is responsible for developing the next state inputs to the state registers and is derived directly from the state diagrams.

The NET[32:0] outputs are logic functions which were necessary for generation of the next state equations which were also needed for the global output functions. Rather than duplicate the logic, the logic results are exported to the Global Output module using the NET[32:0] labeling convention for convenience.

CONTROL STATE REGISTERS (21)

The Comm Link Controller is a 16 state state machine which therefore requires 16 registers to implement an unencoded machine architecture.

GLOBAL OUTPUT EQUATIONS (22)

Functions which are needed to control modules outside of the Comm Link Controller module are contained in this section. This module makes extensive use of logic functions developed in the Control State Equation module and input via the NET[32:0] bus. Refer to the Control State Equation module for details of this logic. All output equations were derived directly from the state diagram(s).

Several sets of latches are included in this module. One set of three latches capture any error codes which are present when in the receive mode (CRC, DMA Overrun, DMA Timeout) or transmit mode (DMA Timeout). Software can read these latches at any time (see address page) with a set bit indicating an error condition, however results shown in the latches are valid only for the last message sequence. These latches must be explicitly cleared by software prior to the start of a new transmission or reception in order for their results to be valid. Also included is a last sequence mode indicator bit. If the last sequence completed was a reception, the bit is set. If it was a transmit, the bit is cleared.

The other latch in this module is the end-of-frame latch which is used for interrupt generation. This is cleared via the RESET*L input which is intended to be driven by an OR of the hardware reset line or via software (see INIT*L on address page).

It is generally advisable for software, at the completion of a transmit or receive sequence, to read the status bits, perform an INIT to make sure the hardware is in a known state, and then setup and start the next transmit or receive sequence.

2 BIT COUNTER (23)

Counter used during the transmit process to bypass the CRC, Bit Stuffing, and Scrambling functions during the 4 byte start sequence of the Preamble and Start ID.

A load of this counter always presets a zero since it's only purpose is to count from zero to three.

6 BIT COUNTER (24)

Counter used to actually count the bits during the receive and transmit processes. Normally, this counter counts from one to eight to turn the bit stream into a byte stream or vice versa. During transmit, this counter is also used to count from 1 to 32 to shift out the 32 bits of CRC data, hence a 6 bit counter is required.

A load of this counter always presets a one.

OUTPUT MULTIPLEXER (25)

This logic is used at the top level of the FPGA design to switch bytes of data onto the CPU data bus. One set of inputs is used for DMA data, one for status/data, one for FPGA and board-level hardware revision information, and one for DMA ending address information. See address page for details on mapping for software reads of status/data and revision information.

ENABLED MUX FLIP FLOP (26)

Used as the basic shift register element in the Shift Register and Queue module. An enabled flip flop was required to allow for the inhibition of shifting during bit stuffing, and the four input mux allows the shift register to function as a shift register in the one position, or to load data from the queue, the StopID, or the Postamble in the other positions respectively.

CHIP SELECTS (27)

This module contains the chip selects for the UART(s), RAM, and ROM (see address page for specifics).

OUTPUT LATCHES (28)

This module contains output level latches for the LED's, the RS-232 level translator interface, and the EEPROM inputs. See the address section for specifics on the software interface.

Only EEPROM_DO=0 and RCVR_ON=0 default at powerup via hardware reset. All other latches must be explicitly initialized by software (LED1, LED2, SHUTDOWN, EEPROM_CLOCK, CTS, DCD).

Each LED can then be turned OFF or ON individually by writing to its respective address with a "1" (OFF) or "0" (ON) in the D0 position.

The SHUTDOWN latch controls the power management feature of the RS-232 level translator. Writing a "1" in the D0 position to this address will assert shutdown, writing a "0" will deassert shutdown. With shutdown asserted, the level translator power consumption drops by a factor of approximately 1000 (10 mA to 10 uA) by turning off the transmitter. The receive function is still enabled so that incoming messages and control signal (RTS) are still active. When exiting shutdown mode, the software must write out the proper bit and wait 8 mS until valid transmissions can occur. Note that in the case of outputting control signals, software can write the proper signal (ie. CTS) immediately and the signal will become valid sometime during the 8 mS power-up time. Software must not, however, write data out during this time because it may get lost. CTS and DCD are held deasserted when the transmitter output is shutdown.

Latches are provided for data, and clock input lines to the EEPROM. Also, the data output from the EEPROM may be read by software via the status byte. Very little hardware support is provided for the EEPROM due to the limited resources available in the FPGA. Therefore, software must assume virtually all responsibility for maintaining the interface.

The EEPROM is a Microchip 24LC01B 128 x 8 serial in/out device that has a minimum clock time of 10 uS per bit. Therefore, special handling is required on the part of the software in order to serialize/deserialize the data and to provide the proper clock and chip select timing to the chip. Consult the Microchip data book for operational modes and details.

RCVR_ON listed in the addressing information controls the power to the analog receive circuitry. This defaults to off at reset. When powering up the receiver circuits, there is a finite warmup time (TBD) which must be considered. This circuit should be powered off as much as practical to conserve battery life. The power to the analog receiver section can actually be controlled in two different ways: manually, as just discussed, or automatically. The receiver circuits never turn off automatically (except with a system reset). The circuits will turn on automatically, however, whenever a receive sequence is started. Therefore, the power on for the receiver circuit is actually an OR of the manual RCVR_ON control and the automatic on performed when a receive sequence starts. This latter feature allows delayed automatic receptions to begin while still excercising power conservation and minimizing software interrupts.

INTERRUPT LOGIC (29)

The Interrupt Logic prioritizes the interrupt sources as discussed in the Top Level discussion and also provides support logic for the RTS change-of-state interrupt. The RTS interrupt is masked at reset and must be enabled by software before any interrupts will be generated (see address page for details). Once enabled, any shift in level from asserted to deasserted or back again will generate an interrupt. This interrupt is latched and must be specifically cleared (disabled) by software as part of an ISR. Clearing an interrupt also disables future interrupts. Therefore, under normal operation, the software interrupt service routine will need to first clear the interrupt and then reenable the RTS interrupts.

The RTS Interrupt is logically "ORed" with the UART interrupt, so the software must read the current RTS level and/or the UART status register to determine the source of the interrupt. Note that a read of RTS reads the value present on the line at that instant, while the interrupt generation logic latches the signal from a prior instant in time. Therefore, if RTS is only held momentarily a false poll may result. Also, the RTS line is sampled every 125 nS, therefore state changes which occur and then disappear in less than 125 nS may not be recognized.

One additional consideration is necessary for units that contain the debug UART. This device's interrupt is "ORed" with the Host IF UART. Therefore, if the debug serial routines are written as interrupt driven versus polling routines, they must determine the cause of the interrupt. Similiarly, the Host IF ISR must also take this into consideration. It may be advisable to make the debug service poll based, using the 10 mS heartbeat interrupt to accomplish the polling. This would eliminate the ambiguity.

QUEUE POINTER COUNTER (30)

7 BIT LATCH (31)

7 BIT COMPARATOR (32)

COMM LINK FPGA ADDRESSING

It is important to note that only partial address decoding is used for most functions listed below in order to preserve FPGA resources. Therefore, images of a particular location may appear in multiple places. For instance, UART location 10000h can be accessed at memory locations 10000h, 10020h, 10040h, etc. given that its 16 bytes of addresses are mapped into a 32 byte address space. Care must be exercised by software to avoid writes to unintended locations.

| SIGNAL NAME | ADDRESS | R/W | SIZE | FUNCTION |
|---|---|---|---|---|
| ROM_CE | 0000-7FFF | R | B/W/LW | Chip select for EPROM |
| RAM_CE | 8000-FFFF | R/W | B/W/LW | Chip select for RAM |
| UART_CE | 10000-17FFF | R/W | B | Chip select for Host IF UART* |
| DEBUG_CE | 28000-2FFFF | R/W | B | Chip select for debug UART* |
| STATUS | 18000 | R | B | Read status info** |
| REVISION | 18002 | R | B | Read revision info*** |
| ENABLE | 18004 | R | B | Start 11 bit cntr,clear done flag |
| DISABLE | 18006 | R | B | Stop 11 bit cntr,clear done flag |
| DMA_END_LO | 18008 | R | B | Low byte final DMA address |
| INTERRUPT_CLR | 1800A | R | B | Clear general interrupt latch |
| DMA_END_HI | 1800C | R | B | High byte final DMA address |
| LED1 | 18000 | W | B | D0=0=ON, D0=1=OFF |
| LED2 | 18002 | W | B | D0=0=ON, D0=1=OFF |
| SHUTDOWN | 18004 | W | B | D0=0=~SHTDN, D0=1=SHTDN |
| EEPROM DO | 18006 | W | B | D0=EEPROM DATA INPUT |
| EEPROM CLOCK | 18008 | W | B | D0=0=LOW, D0=1=HIGH |
| CTS | 1800A | W | B | D0=0=CTS, D0=1=~CTS |
| DCD | 1800C | W | B | D0=0=DCD, D0=1=~DCD |
| RCVR_ON | 1800E | W | B | D0=1=ON, D0=0=OFF |
| LO_SPEED*L | 20000 | R/W | B | CPU clock=4 MHz, ~DTACK |
| RX_MODE*L | 20002 | R/W | B | IR logic to RX mode |
| TX_MODE*L | 20004 | R/W | B | IR logic to TX mode |
| RX_MODE_NORM*L | 20006 | R/W | B | Default normal mode |
| RX_MODE_PROM*L | 20008 | R/W | B | Promiscuous receive mode |
| INIT*L | 2000A | R/W | B | Reset controllers, Clear EOF |
| GO*L | 2000C | R/W | B | Start TX or RX |
| CNT_DRIVE_125 | 2000E | R/W | B | Ext counter input 125 kHz |
| CNT_DRIVE_62.5 | 2000F | R/W | B | Ext counter input 62.5 kHz |
| LOAD_HI*L | 38000 | W | B | Write hi byte of DMA start |
| LOAD_LO*L | 38002 | W | B | Write lo byte of DMA start |
| LOAD_HI_CMP*L | 38004 | W | B | Write hi byte of DMA end |
| LOAD_LO_CMP*L | 38006 | W | B | Write lo byte of DMA end |
| CLR_ERR_FLGS | 38008 | W | B | Clear CRC,DMA,LAST_RX flag |
| RTS_INT_CNTL | 3800A | W | B | D0=0=enable,D0=1=disable |
| DID_STRB_HI*L | 3800C | W | B | Write hi byte of DID |
| DID_STRB_LO*L | 3800E | W | B | Write lo byte of DID |

*All register offsets must be multiplied by two

** Status Info Map D7 => D0:
0 | 0 | LAST_SEQ_RX | DMA_OVERRUN | DMA_TIMEOUT | CRC_ERROR | RTS | EE DATA

*** Revision Info Map D7 => D0:
FPGA REV[3:0] | COMM LINK CCA REV[3:0]

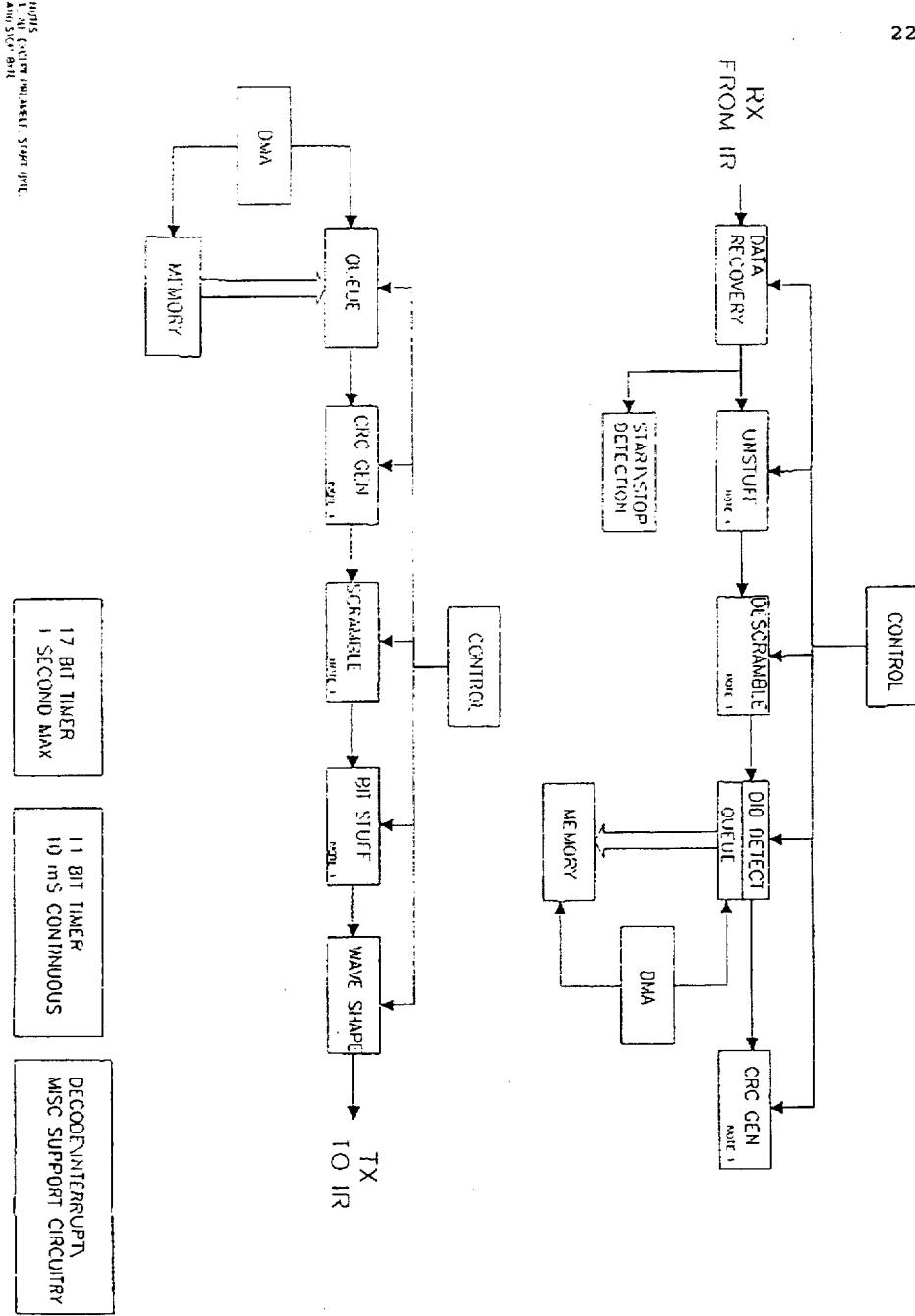

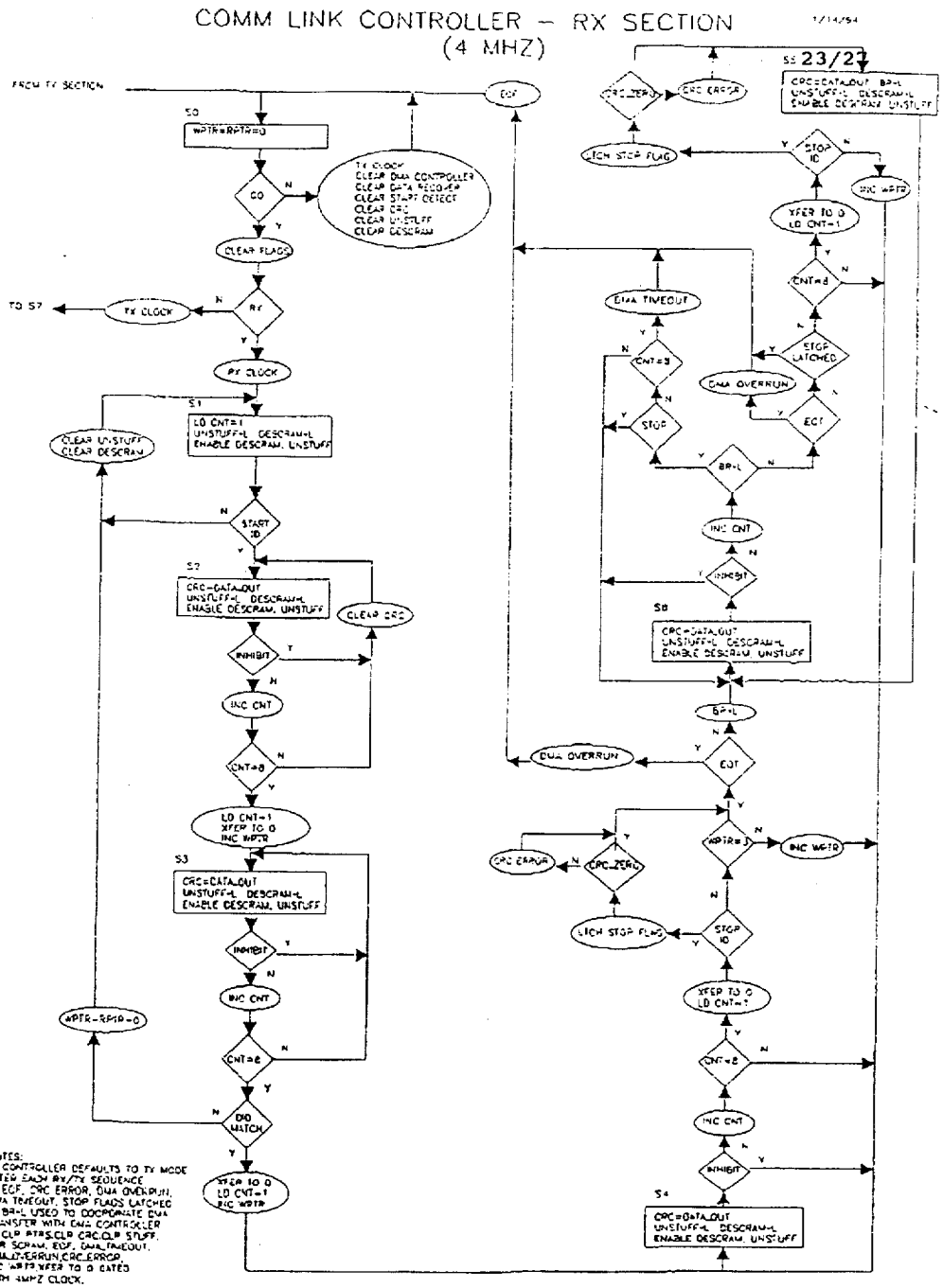

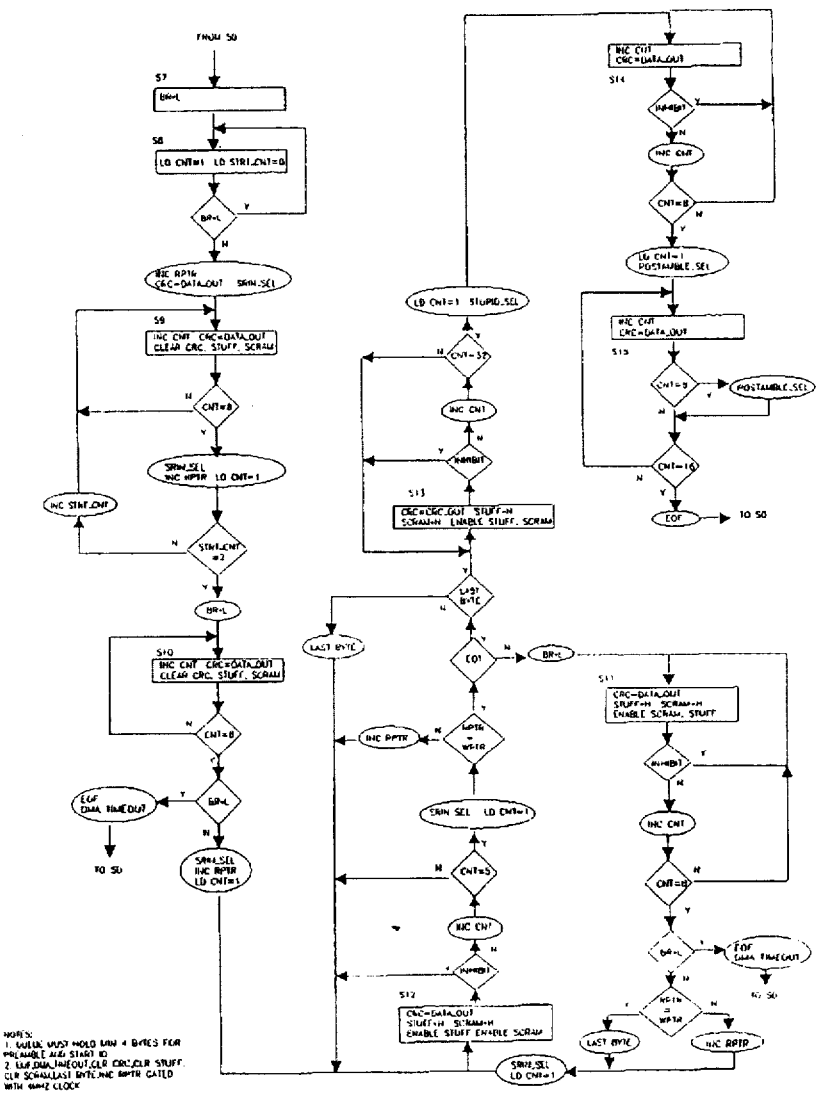

25/27
COMM LINK CONTROLLER – TX SECTION
(4 MHZ)
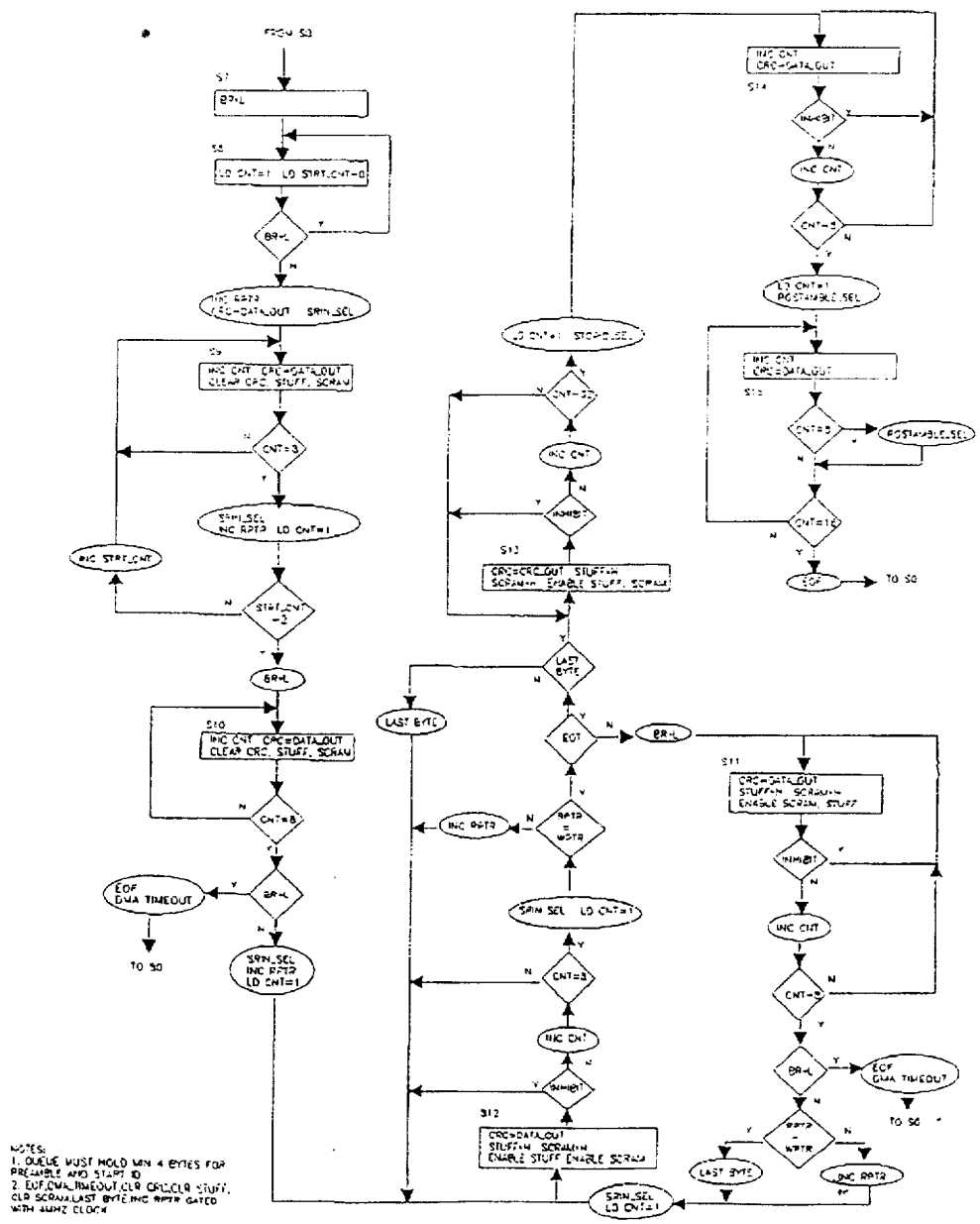

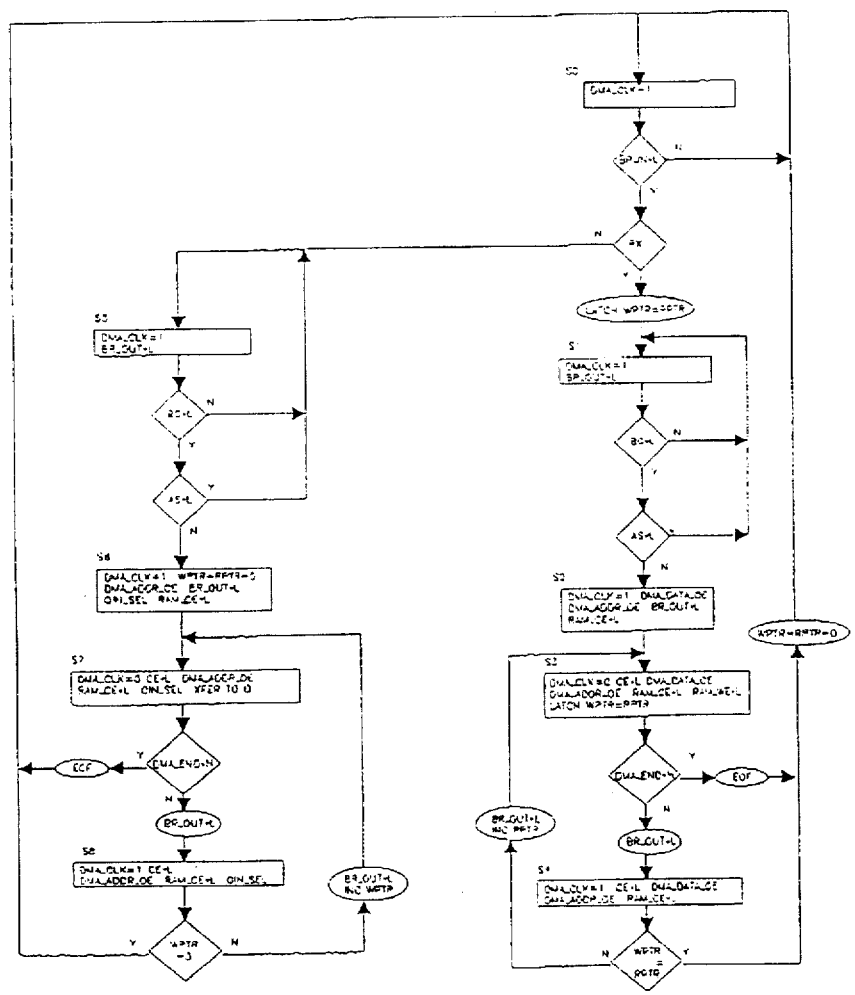

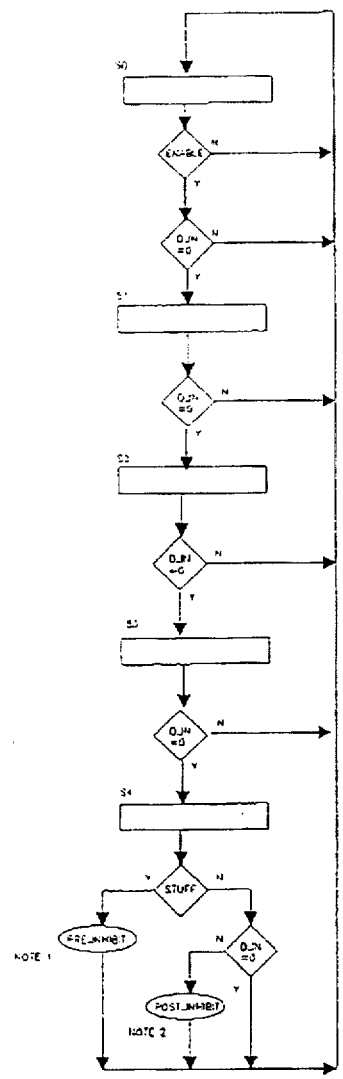

What is claimed is:

1. A method of locating a portable remote station transceiving a diffuse infrared communicated signal within an enclosed area containing a plurality of stationary infrared transceivers interconnected with a central controller, such method comprising the steps of:

detecting a particular transmission of the diffuse infrared communicated signal from the portable remote station within the enclosed area by the plurality of stationary transceivers;

measuring a signal strength of the particular signal from the portable remote station by each stationary transceiver of the plurality of stationary transceivers;

identifying a first stationary transceiver measuring a highest relative signal strength and a second stationary transceiver measuring a second highest relative signal strength of the particular signal from the portable remote station;

determining a relative distance of the portable remote station from the first and from the second stationary transceivers on either side of a center line between the first and second stationary transceivers based upon the measured signal strength; and locating the portable remote station based upon differences in the signal strength measured at each stationary transceivers.

2. The method as in claim 1 further comprising locating the portable remote station on a first side of the centerline dividing the first and second stationary transceivers based upon an identity of a third stationary transceiver of the plurality of stationary transceivers located on the first side of the centerline and receiving a third strongest signal strength from the portable remote station.

3. A method of locating a portable remote station transceiving a diffuse infrared communicated signal within an enclosed area containing a plurality of stationary infrared transceivers interconnected with a central controller, such method comprising the steps of:

detecting a particular transmission of the diffuse infrared communicated signal from the portable remote station within the enclosed area by the plurality of stationary transceivers;

measuring a signal strength of the particular signal from the portable remote station received by each stationary transceiver of the plurality of stationary transceivers;

identifying a first stationary transceiver measuring a highest relative signal strength, a second stationary transceiver measuring a second highest relative signal strength and a third stationary transceiver measuring a third highest relative signal strength of the particular signal from the portable remote station; and locating the portable remote station by reference to a look-up table using the signal measurements of the first, second and third stationary transceivers.

4. A method of locating a portable remote station transceiving a diffuse infrared communicated signal within an enclosed area containing a plurality of stationary infrared transceivers interconnected with a central controller, such method comprising the steps of:

detecting a particular transmission of the diffuse infrared communicated signal from the portable remote station within the enclosed area by the plurality of stationary transceivers;

measuring a parametric value of the particular signal received by each stationary transceiver of the plurality of stationary transceivers;

identifying a first and a second stationary transceiver of the plurality of stationary transceivers receiving the particular transmission of the diffuse infrared communicated signal from the portable remote station first in time and second in time, respectively;

calculating a relative distance of the portable remote station from the first and from the second stationary transceivers on either side of a center line between the first and second stationary transceivers based upon a time of signal arrival from the remote station and the law of cosines; and locating the portable remote station based upon differences in the parametric value measured at each stationary transceivers.

5. The method as in claim 4 further comprising locating the portable remote station on a first side of the centerline dividing the first and second stationary transceivers based upon an identity of a stationary transceiver of the plurality of stationary transceivers located on the first side of the centerline and receiving the particular transmission from the portable remote station third in time.

6. Apparatus for locating a portable remote station transceiving a diffuse infrared communicated signal within an enclosed area containing a plurality of stationary infrared transceivers interconnected with a central controller, such method comprising:

means for detecting a particular transmission of the diffuse infrared communicated signal from the portable remote station within the enclosed area by the plurality of stationary transceivers;

means for measuring a signal strength of the particular signal from the portable remote station by each stationary transceiver of the plurality of stationary transceivers;

means for identifying a first stationary transceiver measuring a highest relative signal strength and a second stationary transceiver measuring a second highest relative signal strength of the particular signal from the portable remote station;

means for determining a relative distance of the portable remote station from the first and from the second stationary transceivers on either side of a center line between the first and second stationary transceivers based upon signal attenuation; and means for locating the portable remote station based upon the relative signal strength of the particular signal measured at the stationary transceivers.

7. The apparatus as in claim 6 further comprising means for locating the portable remote station on a first side of the centerline dividing the first and second stationary transceivers based upon an identity of a third stationary transceiver of the plurality of stationary transceivers located on the first side of the centerline and receiving a third strongest signal strength from the portable remote station.

8. Apparatus for locating a portable remote station transceiving a diffuse infrared communicated signal within an enclosed area containing a plurality of stationary infrared transceivers interconnected with a central controller, such method comprising:

means for detecting a particular transmission of the diffuse infrared communicated signal from the portable remote station within the enclosed area by the plurality of stationary transceivers;

means for measuring a signal strength of the particular signal received from the portable remote station by each stationary transceiver of the plurality of stationary transceivers;

means for identifying a first stationary transceiver measuring a highest relative signal strength, a second stationary transceiver measuring a second highest relative signal strength and a third stationary transceiver measuring a third highest relative signal strength of the particular signal from the portable remote station; and means for locating the portable remote station by reference to a look-up table using the signal measurements of the first, second and third stationary transceivers.

9. Apparatus for locating a portable remote station transceiving a diffuse infrared communicated signal within an enclosed area containing a plurality of stationary infrared transceivers interconnected with a central controller, such method comprising:

means for detecting a particular transmission of the diffuse infrared communicated signal from the portable remote station within the enclosed area by the plurality of stationary transceivers;

means for measuring parametric values of the particular signal received by each stationary transceiver of the plurality of stationary transceivers;

means for identifying a first and a second stationary transceiver of the plurality of stationary transceivers receiving a particular transmission of the diffuse infrared communicated signal from the portable remote station first in time and second in time, respectively;

means for calculating a relative distance of the portable remote station from the first and from the second stationary transceiver on either side of a center line between the first and second stationary transceivers based upon a time of signal arrival from the remote station and the law of cosines; and means for locating the portable remote station based upon the parametric differences of the particular signal measured at the stationary transceivers.

10. The apparatus as in claim 9 further comprising means for locating the portable remote station on a first side of the centerline dividing the first and second stationary transceivers based upon an identity of a stationary transceiver of the plurality of stationary transceivers located on the first side of the centerline and receiving the particular transmission from the portable remote station third in time.

11. A method of locating a portable remote station transceiving a diffuse infrared communicated signal within an enclosed area containing a plurality of stationary infrared transceivers interconnected with a central controller, such method comprising the steps of:

detecting the diffuse infrared communicated signal from the portable remote station within the enclosed area by the plurality of stationary transceivers;

measuring a temporal difference in signal arrival at the plurality of stationary transceivers by the central controller; and locating the portable remote station by the central controller based upon the temporal differences in signal arrival at the stationary transceivers.

12. The method as in claim 11 further comprising the step of dispersing the stationary transceivers throughout an inside surface of the enclosed area.

13. The method as in claim 11 further comprising the step of identifying a first and a second stationary transceiver of the plurality of stationary transceivers receiving a particular transmission of the diffuse infrared communicated signal from the portable remote station first in time and second in time, respectively.

14. The method as in claim 13 further comprising the step of calculating a relative distance of the portable remote station from the first and from the second stationary transceivers on either side of a center line between the first and second stationary transceivers based upon the law of cosines.

15. The method as in claim 14 further comprising the step of locating the portable remote station on a first side of the centerline dividing the first and second stationary transceivers based upon an identity of a stationary transceiver of the plurality of stationary transceivers located on the first side of the centerline and receiving the particular transmission from the portable remote station third in time.

16. Apparatus for locating a portable remote station transceiving a diffuse infrared communicated signal within an enclosed area containing a plurality of stationary infrared transceivers interconnected with a central controller, such apparatus comprising:

means for detecting the diffuse infrared communicated signal from the portable remote station within the enclosed area by the plurality of stationary transceivers;

mean for measuring a temporal difference in signal arrival at the plurality of stationary transceivers by the central controller; and means for locating the portable remote station by the central controller based upon the temporal differences in signal arrival at the stationary transceivers.

17. The apparatus as in claim 16 further comprising means for identifying a first and a second stationary transceiver of the plurality of stationary transceivers receiving a particular transmission of the diffuse infrared communicated signal from the portable remote station first in time and second in time, respectively.

18. The apparatus as in claim 17 further comprising means for calculating a relative distance of the portable remote station from the first and from the second stationary transceivers on either side of a center line between the first and second stationary transceivers based upon the law of cosines.

19. The apparatus as in claim 18 further comprising means for locating the portable remote station on a first side of the centerline dividing the first and second stationary transceivers based upon an identity of a stationary transceiver of the plurality of stationary transceivers located on the first side of the centerline and receiving the particular transmission from the portable remote station third in time.

20. Apparatus for locating a portable remote station transceiving a diffuse infrared communicated signal within an enclosed area containing a plurality of stationary infrared transceivers interconnected with a central controller, such apparatus comprising:

an infrared receiver for detecting the diffuse infrared communicated signal from the portable remote station within the enclosed area by the plurality of stationary transceivers;

a time base for measuring a temporal difference in signal arrival at the plurality of stationary transceivers by the central controller; and a mathematics processor within the central controller for locating the portable remote station based upon the temporal differences in signal arrival at the stationary transceivers.

21. The apparatus as in claim 20 further comprising a stationary transceiver processor for time stamping receipt of each signal from the portable remote station under the time base and transferring the time stamped signal to the central processor.

22. The apparatus as in claim 21 further comprising a processor within the central controller for comparing the time stamped signals received from each stationary transceiver for identifying a first and a second stationary transceiver of the plurality of stationary transceivers receiving a particular transmission of the diffuse infrared communicated signal from the portable remote station first in time and second in time, respectively.

23. The apparatus as in claim 22 wherein the mathematics processor further comprises a look-up table within a memory of the mathematics processor containing predetermined distances between stationary transceivers for calculating a relative distance of the portable remote station from the first and from the second stationary transceivers on either side of a center line between the first and second stationary transceivers based upon the signal strength measured by the first and second stationary transceivers and the law of cosines.

24. The apparatus as in claim 23 further comprising means for locating the portable remote station on a first side of the centerline dividing the first and second stationary transceivers based upon an identity of a stationary transceiver of the plurality of stationary transceivers located on the first side of the centerline and receiving the particular transmission from the portable remote station third in time.

* * * * *